United States Patent [19]
Singh et al.

[11] Patent Number: 5,987,468
[45] Date of Patent: Nov. 16, 1999

[54] STRUCTURE AND METHOD FOR EFFICIENT PARALLEL HIGH-DIMENSIONAL SIMILARITY JOIN

[75] Inventors: Vineet Singh, San Jose, Calif.; Khaled Alsabti; Sanjay Ranka, both of Gainesville, Fla.

[73] Assignee: Hitachi America Ltd., Tarrytown, N.Y.

[21] Appl. No.: 08/989,847

[22] Filed: Dec. 12, 1997

[51] Int. Cl.⁶ .................................................. G06F 17/30
[52] U.S. Cl. .................................. 707/100; 707/6; 707/7; 710/132; 395/800.11
[58] Field of Search .................... 395/800.11; 710/129, 710/132; 707/1, 6, 100, 7

[56] References Cited

U.S. PATENT DOCUMENTS

| | | | |
|---|---|---|---|
| 4,811,210 | 3/1989 | McAulay | 710/132 |
| 5,579,471 | 11/1996 | Barber et al. | 395/326 |
| 5,647,058 | 7/1997 | Agrawal et al. | 395/601 |
| 5,842,031 | 11/1998 | Barker et al. | 395/800.11 |

OTHER PUBLICATIONS

Agrawal, R., et al., "Fast Similarity Search in the Presence of Noise, Scaling, and Translation in Time–Series Databases", Proceedings of the 21st VLDB Conference, Zürich, Switzerland, 1995, pp. 490–501.

Alsabti, K., et al., "A One–Pass Algorithm for Accurately Estimating Quantiles for Disk–Resident Data", Proceedings of the 23rd VLDB Conference, Athens, Greece, 1997, pp. 1–9.

Alsabti, K., et al., "An Efficient Parallel Algorithm for High Dimensional Similarity Join", Information Technology Group (ITG) of Hitachi America, Ltd., Oct. 8, 1997, pp. 1–27, Figs. 1–6.

Beckmann, N., et al., "The R*–tree: An Efficient and Robust Access Method for Points and Rectangles", Proc. ACM SIGMOD, Atlantic City, New Jersey, May 1990, pp. 322–331.

Bentley, J., "Multidimensional Binary Search Trees Used for Associative Searching", Communications of the ACM, vol. 18, No. 9, Sep. 1975, pp. 509–517.

Brinkhoff, T., et al., "Efficient Processing of Spatial Join Using R–trees", Proc. 1993 ACM SIGMOD Conf. on Management of Data, 1993, pp. 237–246.

Faloutsos, C., et al., "Analysis of Object–Oriented Spatial Access Methods", ACM SIGMOD, vol. 16, No. 3, 1987, pp. 426–439.

Faloutsos, C., et al., "Fast Subsequence Matching in Time–Series Databases", Proc. Of the ACM SIGMOD Conf. on Management of Data, May 1994, pp. 419–429.

Katayama, N., et al., "The SR–tree: An Index Structure for High–Dimensional Nearest Neighbor Queries", Proc. of ACM SIGMOD Int'l. Conf. on Management of Data, 1997, pp. 369–380.

(List continued on next page.)

*Primary Examiner*—Wayne Amsbury
*Assistant Examiner*—Shahid Alam
*Attorney, Agent, or Firm*—Flehr Hohbach Test Albritton & Herbert

[57] ABSTRACT

Multidimensional similarity join finds pairs of multi-dimensional points that are within some small distance of each other. Databases in domains such as multimedia and time-series can require a high number of dimensions. The $\epsilon$-k-d-B tree has been proposed as a data structure that scales better as number of dimensions increases compared to previous data structures such as the R-tree (and variations), grid-file, and k-d-B tree. We present a cost model of the $\epsilon$-k-d-B tree and use it to optimize the leaf size. This new leaf size is shown to be better in most situations compared to previous work that used a constant leaf size. We present novel parallel procedures for the $\epsilon$-k-d-B tree. A load-balancing strategy based on equi-depth histograms is shown to work well for uniform or low-skew situations, whereas another based on weighted, equi-depth histograms works far better for high-skew datasets. The latter strategy is only slightly slower than the former strategy for low skew datasets. The weights for the latter strategy are based on the same cost model that is used to determine optimal leaf sizes.

30 Claims, 17 Drawing Sheets

OTHER PUBLICATIONS

Li, C., et al., "HierarchyScan: A Hierarchial Similarity Search Algorithm for Databases of Long Sequences", Proc. of the 12th Int'l Conf. On Data Engineering, New Orleans, Louisana, Feb. 1966, pp. 546–553.

Li, X., et al., "On the versatility of parallel sorting by regular sampling", Parallel Computing, vol. 19, No. 10, Oct. 1993, pp. 1079–1103.

Narasimhalu, A., et al., "Multimedia Information Systems: The Unfolding of a Reality", IEEE Computer, vol. 24, No. 8, Oct. 1991, pp. 6–8.

Niblack, W., et al., "The QBIC Project: Querying Images by Content Using Color, Texture, and Shape", SPIE 1993 Int'l Symposium on Electronic Imaging: Science and Technology, 1993, pp. 173–187.

Nievergelt, J., et al., "The Grid File: An Adaptable, Symmetric Multikey File Structure", ACM Transactions on Database Systems, vol., 9, No. 1, Mar. 1984, pp. 38–71.

Robinson, J. T., "The K–D–B–Tree: A Search Structure for Large Multidimensional Dynamic Indexes", Proc. 1981 ACM SIGMOD Conf. On Management of Data, pp. 10–18.

Roussopoulos, N., et al., "Direct Spatial Search on Pictorial Databases Using Packed R–trees", ACM SIGMOD, 1985, vol. 14, No. 4, pp. 17–31.

Shafer, J., et al., "Parallel Algorithms for High–dimensional Proximity Joins", Proceedings of the 23rd VLDB Conference, Athens, Greece, 1997, pp. 176–185.

Shim, K., et al., "High–dimensional Similarity Joins", Proc. of the 13th Int'l Conference on Data Engineering, Birmingham, U.K., Apr. 1997 (11 pages).

White, D., et al., "Similarity Indexing with the SS–tree", Proc. Of the 12th Int'l Conf. On Data Engineering, Feb. 1996, pp. 516–523.

Azadegan, S., "A Parallel Join Algorithm for SIMD Architectures", Journal Of Systems And Software, vol: 39, Issue: 3, Dec. 1997, pp. 265–280.

Brinkhoff, T., "Multi–Step Processings of Spatial Joins", SIGMOD Conference 1994 pp. 197–208, May 1994.

Koudas, N., "High dimensional similarity joins: algorithms and performance evaluation", Proceedings of 14th International Conference on Data Engineering, Feb. 1998 pp. 466–475.

Merrett, T., "Distribution Models Of Relations", Fifth International Conference on Very Large Data Bases, 1979. Oct. 1979, pp. 418–425.

Rotem, D., "Spatial Join indices", Proceedings of Seventh International Conference on Data Engineering, Apr. 1991. pp. 500–509.

Theodoridis, Y., "Cost models for join queries in spatial databases", Proceedings of 14th International Conference on Data Engineering, Feb. 1998 pp. 476–483.

TABLE I. DATA STRUCTURE IN MEMORY

| DATA STRUCTURE IN MEMORY |
|---|
| 102 - RETRIEVE ARCHIVE TREATMENT/CONTROL/DIAGNOSTIC/DECISION |
| 103 - SYSTEM MONITORING/MEASUREMENT PROCEDURE |
| 104 - RECEIVE MULTIDIMENSIONAL DATA/OBJECT/SYMBOL SET |
| 105 - PARALLEL SIMILARITY JOIN PROCEDURE |
|     110 - DATA PARTITIONING TYPE SELECTION PROCEDURE |
|     111 - QUANTILE PARTITIONING (PQ) PROCEDURE |
|         SUB PARTITION QUANTILE ESTIMATION PROCEDURE |
|         SUB PARTITION DIVISION PROCEDURE |
|         DATA SET REDISTRIBUTION PROCEDURE |
|     112 - ESTIMATED QUANTILE PARTITION (PQEST) PROCEDURE |
|     113 - WEIGHTED PARTITION (PW) PROCEDURE |
|         DATA SET SAMPLING PROCEDURE |
|         QUANTILE PARTITION PROCEDURE |
| PROCESSOR OPERATING SYSTEM PROCEDURE |
|     JOIN TEST COMPUTATION PROCEDURE |
|     POINT WEIGHT DETERMINATION/ASSIGNMENT PROCEDURE |
|     WEIGHTED PARTITION APPLICATION PROCEDURE |
|         DATA SET SUB PARTITION SORTING PROCEDURE |
|         SUB PARTITION POINT WEIGHT PREFIX-SUM PROCEDURE |
|         SUB PARTITION DATA SET BOUNDARY BASED RED. PROCEDURE |
|     ENTIRE DATA SET BOUNDARY BASED REDISTRIBUTION PROCEDURE |
| 120 - LOCAL TREE CONSTRUCTION PROCEDURE |
| 130 - INTERSECTED REGIONS PROCEDURE |
|     401 - NEIGHBORING PROCESSOR DETERMINATION PROCEDURE |
|     402a - SIMPLE LEVEL LIST BUILD PROCEDURE |
|     402b - LEVEL LIST BUILD PROCEDURE |
|     403 - LEVEL LIST NEIGHBOR EXCHANGE PROCEDURE |
|     404 - INTERSECTED REGION DETERMINATION PROCEDURE |
|     405a - INTERSECTED REGION ASSIGNMENT TYPE SELECTION PROCEDURE |
|     405b - LOCAL INTERSECTED REGION ASSIGNMENT PROCEDURE |
|     405c - GLOBAL INTERSECTED REGION ASSIGNMENT PROCEDURE |
| 140 - LOCAL-TREE/OVERLAP-REGION SIMILARITY JOIN PROCEDURE |
|     600 - SELF-JOIN PROCEDURE |
|         800 - NON-SELF-JOIN PROCEDURE |
| 1000 - OUTPUT MULTI-DIMENSIONAL DATA SET POINT PAIRS |
| 2000 - CONTROL DETERMINATION PROCEDURE |
| 3000 - CONTROL APPLICATION PROCEDURE |
| WEIGHT (W) COMPUTATION PROCEDURE |
| COST COMPUTATION PROCEDURE |
| LOCAL DATA POINTS |
| NON-LOCAL DATA POINTS |
| HISTOGRAM PROCEDURE |
| QPAQ PROCEDURE |
| LIST AND SIMPLE LIST BUILD PROCEDURES |

*FIG. 3*

STRUCTURE AND METHOD FOR EFFICIENT PARALLEL HIGH-DIMENSIONAL SIMILARITY JOIN

FIELD OF INVENTION

This invention pertains generally to structure and method for similarity joins, and more particularly to structure and method for efficient parallel high-dimensional similarity join using an epsilon-k-d-B tree structure.

BACKGROUND OF INVENTION

Multidimensional similarity join finds pairs of multi-dimensional points that are within some predetermined and typically small distance of each other. The "dimensions" may be any quantifiable property or characteristic and need not be limited to spatial dimensions as the term is routinely used. While some traditional applications, such as 2-D or 3-D mapping applications only require two or three dimensions, many important emerging applications require the number of dimensions to be quite large—possibly in the tens or hundreds, even thousands. Application domains include multimedia databases [See Relevant Literature description section following for references 11, 16, 17], medical databases [5, 21], scientific databases [22], and time-series databases [9, 1, 14]. Such databases may be constructed from collection and monitoring of physical systems such as medical instrumentation, including for example, thermometers, blood pressure sensors, blood pressure monitors and sensors, brain wave sensors and sampling systems, blood chemistry, diagnostic histories, and all other manner of medical, chemical, biological, physiological or other data. Data collected from remote sensing apparatus including photographic imagery data collected from hand-held, orbital, or other sensors, radars, and the like, cultural and other Geographical Information System (GIS) type parameters, data, and other information. Other physical systems may likewise be monitored, and the collected data signals may be categorized, stored in databases, and used for example for controlling other processes or as a decision metric when used in comparison to historical databases. These characteristics form one or more values of a multi-valued multi-dimensional data point.

Typical examples of similarity join applications include: finding all pairs of U.S. mutual funds with similar price histories; discovering images that are similar to each other; and identifying patients with similar symptoms over time; to mention only a few. Similarity join operations may also be used for "data mining" operations.

A pair of points is considered "similar" if the distance between them is less than epsilon ($\epsilon$) for some distance metric, where E is a user-defined parameter. In this description, we use $L_p$-norm as the distance metric and it is defined as:

$$L_p = \left(\sum_{i=1}^{d}(|x_i - y_i|)^p\right)^{\frac{1}{p}} \forall \quad 1 \leq p \leq \infty \quad (1)$$

where p identifies the particular distance metric, d is the dimensionality of points x and y, each of which is d-dimensional. $L_\infty$, is defined as the distance metric:

$$L_\infty = \max_{i=1}^{d} |x_i - y_i|.$$

Note that if the number of dimensions (d) is 3 or less, the similarity join can be thought of as being of a spatial nature and the join can be called a "spatial similarity join". Note that $L_p$ is a class of distance metrics, where p identifies the particular metric. $L_1$ is conventionally referred to as the Manhattan distance and is derived from the distances along two orthogonal directions; $L_2$ is the Euclidian distance computed on the basis of a direct line between the two points of interest; and $L_\infty$ is another distance computed as the maximum distance along one of a plurality of dimensions. The distance metrics are conventionally known and not described further. Several data structures have been proposed for multidimensional similarity join including the R-tree family (R-tree, R*-tree, R+tree) [8, 20, 10, 6], grid-file [18], k-d-b tree [19, 7], SS-tree [23] and SR-tree [12] indices. However, generally these and other known data structures are not efficient for performing similarity joins on high-dimensional points because their time and space complexity increase rapidly with increasing dimensionality. For example, a data structure that may be usable for two- or three-dimensional points might typically be unusable for ten- or hundred-dimensional points.

An earlier database procedure involved the K-d (or Kd) tree which was a memory resident procedure; while later extensions or improvements resulted in the K-d-B (or KdB) versions for disk resident implementations, that is for implementations when the database was too large to be entirely memory resident simultaneously. These earlier structures and implementations are known and not described further.

The $\epsilon$-k-d-B tree has been proposed by Agrawal et al. [2] as a multidimensional index structure for performing similarity join on high-dimensional points [2], and is purported to be better than other conventional data structures for performing the similarity join on high-dimensional points. In particular, it is purportedly faster than the $R^+$ tree on some synthetic and real-life datasets. The $\epsilon$-k-d-B tree index structure of Agrawal et al. [2] uses a static constant threshold for the leaf size. When the number of points in a node falls below the fixed leaf size threshold, then further tree construction is stopped for that node and the node is declared to be a leaf node. Reference [2] is incorporated by reference in its entirety.

Therefore, while procedures for performing multi-dimensional similarity joins have evolved somewhat, there remains a need for efficient procedures, method and structure for performing similarity joins on high-dimensional data sets. There also remains a need for methods and structures that are scalable so as to provide efficient joins for large data sets and a large number of processors. Furthermore, there remains a need for a better load balancing load metric that can partition the data set among a plurality of processors based on the characteristics of the data set itself and not limited by a prior statically determined tree characteristic, or solely on equal point distribution of points among processors. These and other problems with conventional structures and methods are solved and will be apparent in light of the detailed description of the invention and accompanying drawings.

BRIEF DESCRIPTION OF THE DRAWINGS

FIG. 3 is an exemplary embodiment of a memory media data structure storing a plurality of objects (data points) and procedures for the similarity join.

PERTINENT LITERATURE

Figure 1:
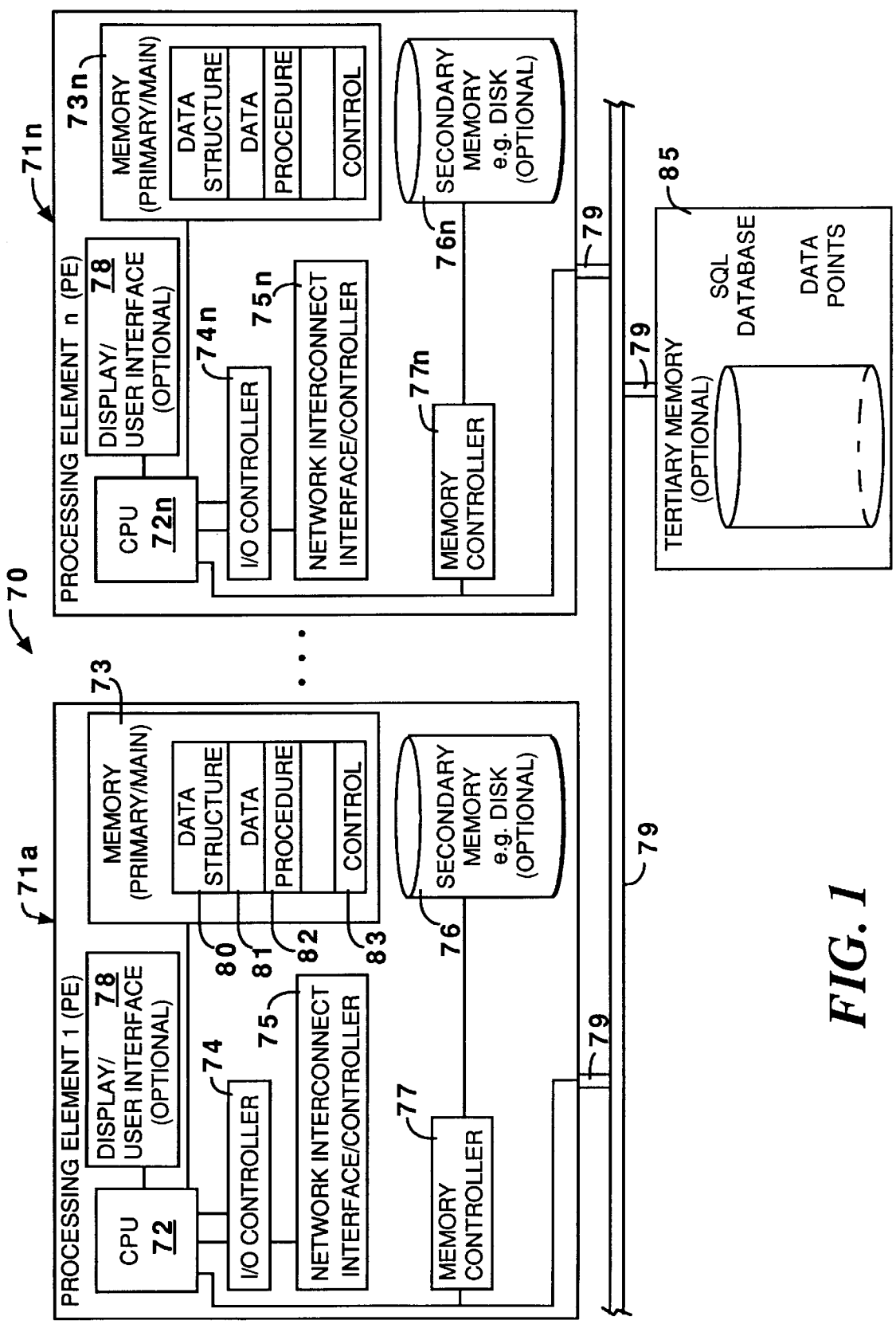
FIG. 1 is exemplary embodiment of a processing system structure for performing the inventive similarity join procedure and subprocedures thereof.

The following literature, indicated by square brackets enclosing a reference number, in the disclosure are pertinent as background to the invention or relative to describing a known procedure performed within one or more inventive procedure of method. They are: [1] Agrawal et al., Proc. Of Vldb, 1995; [2] Agrawal et al., "High-dimensional Similarity Joins" in Proc. Of The 13th Int'l Conference on Data Engineering, 1997; [3] Alsabti and Ranka, in Proc. Of Int'l Conference on High Performance Computing Hipc'97, 1997; [4] Alsabti et al., in Proc. Of VLDB '97 Conference, 1997; [5] Arya et al., IEEE Data Engineering Bulletin, 1993, 16(1):38–42; [6] Beckmann et al., In Proc. Of ACM SIGMOD, 1990, 332–331; [7] Bently, Communication of ACM, 1975, 18(9); [8] Brinnkhoff et al., in Proc. of 1993 ACM SIGMOD Conf. On Management of Data, 1993; [9] Faloutsos et al., in Proc. of ACM SIGMOD Conf. On Management of Data, 1994; [10] Faloutsos et al., ACM SIGMOD, 1987, 16(3); [11] Jagadish, in Proc. of the ACM SIGMOD Conference on Management of Data, 1991; [12] Katayama and Satoh, in Proc. Of ACM SIGMOD Int'l Conf. On Management of Data, 1997; [13] Kumar et al., Introduction to Parallel Computing: Design and Analysis of Algorithms, 1994; [14] Li et Al., in Proc. Of the 12th Int'l Conf. On Data Engineering, 1996; [15] Li et al., Parallel Computing, 1993, 19(10); [16] Narasimhalu and Christodoulakis, IEEE Computer, 1991, 24(10):6–8; [71] Niblack et al., in SPIE 1993 Int'l Symposium on Electronic Imaging: Science and Technology, 1993; [18] Nievergelt et al., ACM Transactions on Database Systems, 1984, 9(1); [19] Robinson, in Proc. 1981 ACM SIGMOD Conf. On Management of Data, 1981; [20] Roussopoulos and Leifker, ACM SIGMOD, 1985, 14(4); [21] Toga et Al., Neurosc. Abs., 1990; [22] Vassiliadis, in Int'l Workshop on Applications of Artificial Intelligence in Solar Terrestrial Physics, 1993, [23] White and Jain, in Proc. of the 12th Int'l Conf. On Data Engineering, 1996; [24] X. Li, P. Lu, J. Schaeffer, J. Shillington, P. S. Wong, and H. Shi, in "On the Versatility of Parallel Sorting by Regular Sampling, in Parallel Computing, 19(10):543–550, October 1993; [25] M. Blum et al., Time Bounds for Selection, in Journal of Computers and Systems, 7:4:448–461, 1972, [26] K. Batcher, Sorting Networks and their Applications, in Proceedings of the AFIPS Spring Joint Computing Conference, Vol. 32, 1968; and [27] V. Kumar, A. Grama, A. Gupta, and G. Karypis, Introduction to Parallel Computing: Design and Analysis of Algorithms. The Benjamin/Cummings Publishing Company, Inc., 1994.

SUMMARY OF INVENTION

A parallel implementation of a similarity join method and structure involving an ∈-k-d-B tree database structure is provided to efficiently join multi-dimensional objects to generated pairs of similar objects or items, such as database points. The inventive structure and method advantageously provide a work or cost model that identifies an optimum leaf node size to achieve optimum work load balancing, and which may be dynamically determined rather than being a fixed constant as is conventionally done. The weights for the latter load balancing strategy are based on the same cost model that is used to determine optimal leaf sizes.

In one aspect the invention provides a method of joining the objects based on predetermined or user defined similarity criteria for execution in a computing system having a plurality of interconnected processing elements and a memory storing an object set comprising a plurality of objects. The method includes storing in the memory, references to the objects; partitioning the object set into a plurality of subpartitions to associate the objects among the processing elements; and within each particular processing element, constructing an object tree structure organizing the objects associated with the particular processing element, determining intersecting regions with neighboring processing elements for each the particular processing element based on predetermined first rules; exchanging objects between each the particular processing element and the neighboring processing elements based on predetermined second rules; and joining the objects based on a predetermined object similarity criteria to generate joined groups of multi-dimensional objects.

In another aspect the invention provides a computer readable storage medium for use with a computer system. The system has a plurality of processors and an optional user interface for receiving commands from a user, a storage medium storing a plurality of objects and a plurality of executable procedures. Each procedure includes at least one executable instruction which instructs the computer to search the plurality of objects according to query inputs, or rules, from the user to identify particular ones of the plurality of objects having a desired similarity characteristic, where the plurality of instructions include instructions which instruct the computer to store ones of the plurality of objects in the memory; instructions which instruct the computer to partition the objects into a plurality of subpartitions and to associate ones of the plurality of objects among the plurality of processors; instructions which instruct the computer to construct a local ε-k-d-B object tree structure organizing the ones of the plurality of objects associated with the particular processor; instructions which instruct the computer to determine intersecting regions of the object space with neighboring processors; instructions which instruct the computer to exchange objects with neighboring processors based on predetermined rules where the neighboring processors are processors associated with objects that are within some predetermined distance; and instructions which instruct the computer to join the objects based on a predetermined object similarity criteria to generate joined groups of multi-dimensional objects. The objects comprise a data structure representing the objects in hierarchical manner, and include an array of database elements and indices, and pointers associated with the elements and indicies. Tthe procedures further including instructions for traversing the data structure using the array of indices and pointers to access the contents of the database elements; and procedures for establishing the data structure in the memory to represent the joined groups of multi-dimensional objects.

In yet another aspect, the invention provides a computer system comprising a plurality of processing elements each the processing element having a processor, such as a central processing element of CPU, for executing instructions and an associated memory connected to the processing element, a memory storing objects and a plurality of procedures; storage for storing a plurality of objects; an interconnect network coupling the processing elements with the associated memory and to the storage. The plurality of procedures including a procedure for performing a multi-dimensional similarity join operation on the objects to generate pairs of joined multi-dimensional objects; and procedure execution means for executing the procedure for performing the multi-dimensional similarity join operation to generate the pairs of joined multi-dimensional objects.

In yet a further aspect the invention provides, in a computer system having a multiplicity of processing elements each having a central processing unit and memory and wherein the processing elements are connected by an interconnection network, a method for rapidly and efficiently performing a parallel query of a database of high-dimensional data items to identify similar items having user defined similarity characteristics and joining the similar items into an output set of data items; a method characterized in that the database, an ε-k-d-B tree structure, that is partitioned among the multiplicity of processing elements based on a load balancing weighting operation rather than on the number of points alone, and wherein the weightings are computed based on the tree traversal cost and the tree computation cost in combination.

In another aspect, the invention provides a weighted quantiling method of partitioning a database comprised of a d-dimensional data set of items among a plurality of processing elements and memory associated with each the processing elements, the method comprising the steps of: generating a sampled data set of size s from the entire data set; partitioning the sampled data set using a quantile partitioning procedure; within each the processing element, constructing a local ε-k-d-B tree for each data points associated with each the partitioned sampled data set on a point-by-point basis until all data points in the partition have been placed in the tree; identifying and exchanging intersected regions among the processing elements; computing the number of join tests that would be required to join the data sets but without actually joining the data; computing a data point weight value for each point based on the computed number of join tests; perform weighted partitioning of the data set using the weight values to take into account the work load associated with particular ones of the points in addition to the number of points in each partition to determine weighted region boundaries for each of the processing elements; and redistribute the entire data set using region boundaries identified by the weighted partitioning.

Various other enhancements and optional features are also described in the accompanying detailed description and drawings.

DETAILED DESCRIPTION OF EMBODIMENTS
OF THE INVENTION

Overview of the Inventive Structure and Method

The inventive structure and method are directed to multidimensional similarity joins, including a parallel similarity join and several inventive sub-procedures applicable to the overall similarity join procedure. A multidimensional similarity join finds pairs of points (in multi-dimensional space) that are within some predetermined small distance E of each other. The similarity join is also referred to in the data mining context. Databases in domains such as multimedia and time-series can require a high number of dimensions. In this context, the ε-k-d-B (or ε-kdB) tree is a data structure that scales better as the number of dimensions increases compared to previous data structures such as the R-tree (and variations), grid-file, and k-d-B tree.

The inventive structure and method advantageously provide a cost model for the ε-k-d-B tree, and implement that cost model to optimize ε-k-d-B tree leaf size which may be dynamically determined. This implementation using this new dynamically determined leaf size is generally better than methods that use a constant or fixed leaf size. Novel parallel structures and procedures are described for implementing the ε-k-d-B tree to receive a collection of database objects and generating a new and different set of output database object or events. A load-balancing strategy based on weighted, equi-depth histograms is also described which is superior to known conventional procedures. The weights for the weighted procedure are based at least in part on the same cost model that was used to determine optimal leaf sizes.

The inventive structure and method provide a cost model for performing similarity join using the ε-k-d-B tree, where the cost model is used to determine the leaf size threshold dynamically. Because this threshold has a significant effect on the cost of the similarity join operation, dynamic determination of an appropriate threshold is highly advantageous. Validation tests conducted on data sets having uniform and Gaussian distributions have shown that the inventive model is effective and efficient. This cost model is particularly useful for parallel similarity join procedures, where a reasonable cost model is necessary in order to perform good load-balancing across multiple processors.

The parallelization of similarity join heretofore has been problematic because of the skew, or difference, in the amount of work (e.g. the cost) required in different parts of the tree. The amount of work required for different parts of the tree may be a super-linear function (e.g. of the form $x^a$ where $a \geq 1$), or a sub-linear function (e.g. of the form $x^a$, where $a \leq 1$), but may typically be less than a square function (e.g. less than $x^2$) of the number of associated data set points.

While a first embodiment (PQ Procedure) provides numerous advantages over the prior art, a second embodiment of the inventive structure and method further presents a novel sampling-based weighted-point scheme (PW Procedure) for the parallelization of this problem. These two embodiments are further described hereinafter. The inventive PW scheme uses a subset of the entire data set to estimate the amounts of work required based on the cost model described subsequently. A comparison between the inventive PW scheme and other schemes based on assigning equal number of points to different numbers of processors shows that the inventive PW scheme performs significantly better in the presence of data skews even for an exemplary system having 16 processors. There will be an even greater improvement between the sample based weighted PW procedure and the other procedures as the number of processors increases because the load balance problem becomes increasingly difficult.

Structure for Performing Similarity Join

An exemplary embodiment of a processing system structure 70 for performing the inventive parallel similarity join procedure and subprocedures thereof is now described relative to FIG. 1. A plurality of processing elements 71 (e.g. 7a, 7b, . . . , 71n) are provided within the inventive processing system 70, each comprising a processor or CPU 72, memory 73, memory controller 77, optional input/output controller(s) 74, and an interface 75 that couples the plurality of processing elements 71 to an interconnect structure 79 and hence to each other and to one or more optional secondary memory 76, and to optional tertiary memory 85 which may, for example, be shared by some or all of the processing elements (e.g. to store the entire database prior to performing the similarity join). The processing elements 71 may be configured and located in a common apparatus, such as a single computer having a plurality of processors, or the processing elements 71 can be separately located such as within separate computing machines at different physical locations, or they may be represented by a combination of such co-located and separate configurations. Similarly, the interconnect structure may be a system or other bus connection within a single multi-processor computer, or other network connection to connect the several processing elements 71. Where a single apparatus (computer) contains the full plurality of processors, each may have associated dedicated memory 71 however other components such as the display/interface 78 may be shared. A variety of bus and network interconnect structures are conventionally known and are not described further.

Main memory 73 is typically solid state memory, often referred as Random Access Memory (RAM) and is high-speed memory typically provided on the same "motherboard" as the Central Processing Unit (CPU). Secondary memory 76 may be the same or other memory, typically providing much greater memory capacity, such as magnetic disc drive(s), optical disc drive(s), CD ROM, magnetic tape, or other conventional data storage memory devices. The main or primary memory holds the datapoints during the various sort, join, tree-build, and other computational operations described hereinafter as well as the executable procedures for performing the inventive method, and an operating system for controlling the underlying operation of each processor.

The secondary memory 76 provides storage for the datapoints of the database, possible intermediate computational results including intermediate database query or build results, and output points, objects, or results. Secondary memory 76 may also store other procedures before and after execution, while procedures currently executing, or portions thereof, may typically reside in main memory 73. Secondary memory will typically be provided within each processing element and separately connected to the interconnected processing elements at large.

Figure 2:
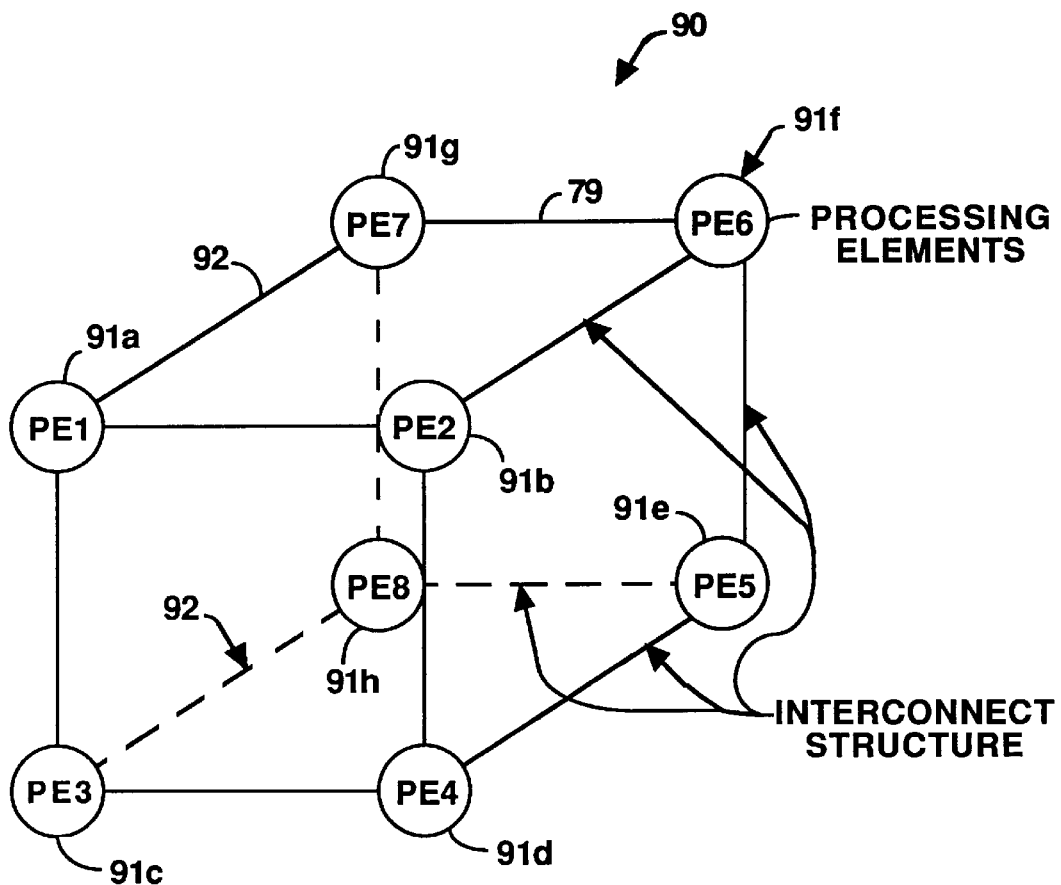
FIG. 2 is an alternative embodiment of a processing structure for the inventive similarity join.

An alternative exemplary processing structure 90 is now described relative to the structure in FIG. 2, which comprises a plurality of processing elements 91 (e.g. 91a, . . . , 91h) connected via an interconnection network 92 having a bandwidth (BW) that scales linearly (or nearly linearly) with the number of processing elements 91. Such BW scaling interconnect networks include hypercubes having, for example, four processing elements 91, and a interconnect between each processing element 91 extending between adjacent processing elements 91. Processing elements 91 have the same internal structure, elements, and characteristics as processing elements 71 already described, except that the structure of interface 75 may be different owing to the different interconnect structure applicable to the second embodiment. These differences are known in the art and not described further.

Another hypercube structure comprises eight processing elements with three network connections such as busses extending from each processor to the three neighboring processor elements. Of course such structure may be extended to a greater number of processing elements and interconnect connections. A further type of interconnect structure connects the processing elements by so called "cross bar" interconnects. These latter bandwidth scaling interconnect configurations or networks are preferred for the inventive similarity join processor structure because they freely permit expansion of the number of processing elements to accommodate larger sets of data or signal objects without sacrificing the speed and operability of the parallel similarity join procedure.

An exemplary embodiment of a memory 73 within a processing element 71 is now described with respect to the memory structure in the memory structure FIG. 3 which includes a list of procedures forming data structures in the memory. The list of procedures identifies the primary processing procedures while other subprocedures which form parts of the procedures are described within the body of the description.

Overview of Parallel Similarity Join

Figure 4:
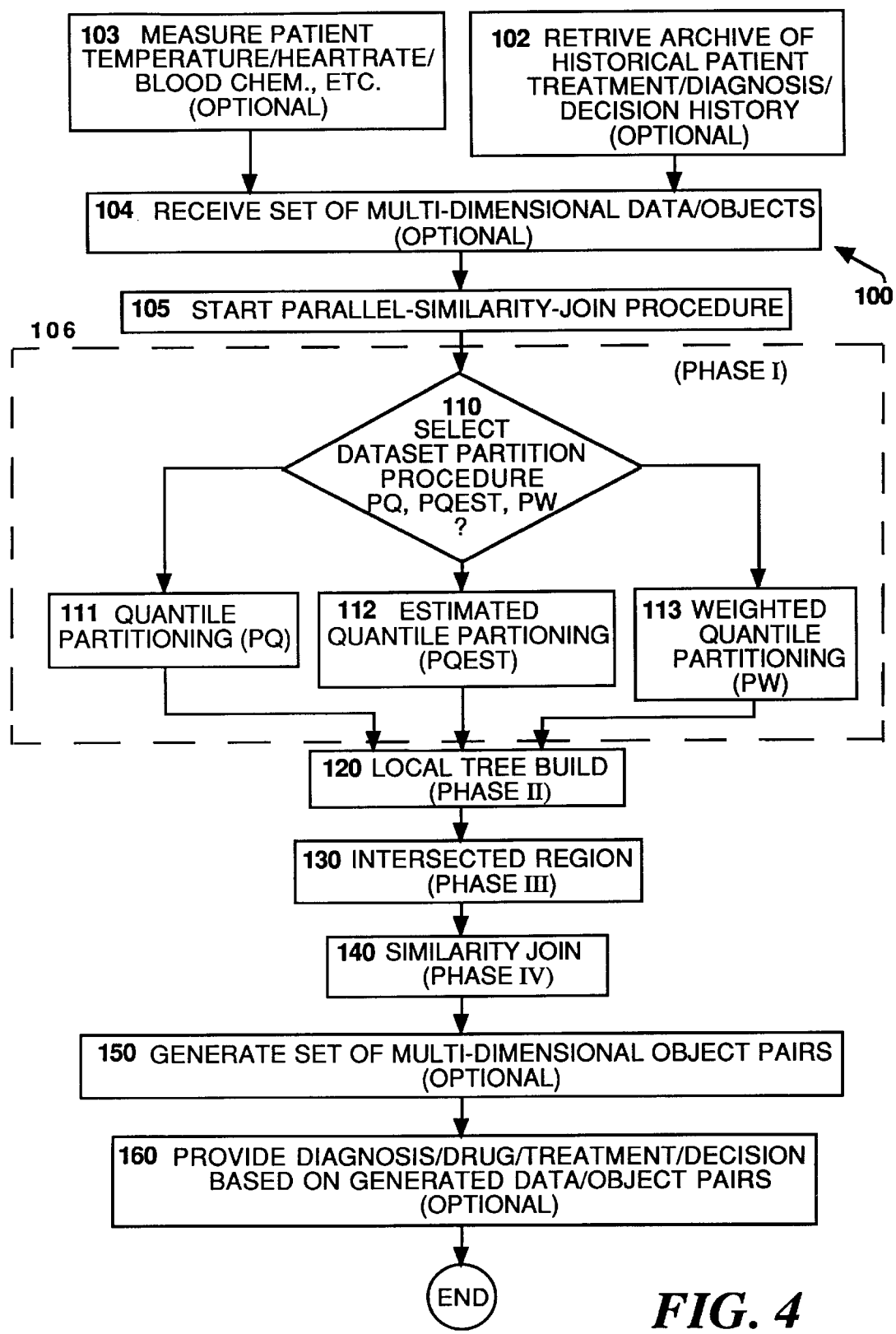
FIG. 4 is an diagrammatic flow-chart showing a top-level exemplary embodiment of the Parallel Similarity Join Procedure.

An embodiment of the Parallel Similarity Join Procedure 100 is now described relative to the flow chart diagram in FIG. 4. Typically, there may exist some set of data in a historical or archival database structure that was generated from a prior collection, sensing, sampling, or analysis, of some physical, cultural, medical, chemical, biological, or abstract system, collection or events, or the like. In some instances the similarity join will involve joining members of this historical database so that retrieval of those members (Step 102) may be an initial stage of the similarity join procedure (Step 100), while in other instances it may be an optional step. In analogous manner, a second optional step may comprise measuring one or more physical, cultural, medical, chemical, biological, or abstract system, collection of events, or the like and providing members of such a collection of events (Step 103) as current input to the similarity join procedure. In any case, some set of multi-dimensional data/object/signal or the like may be provided to, and received as input to, the inventive similarity join procedure (Step 105).

The inventive similarity join procedure (Step 106) involves an optional dataset partition type selection procedure (Step 110) which selects one of the Quantile Partitioning Procedure (Step 111), Estimated Quantile Partitioning (PQEST) Procedure (Step 112), or Weighted Partitioning (PW) Procedure (Step 113) which uses a variant of quantile partitioning. The optional Selection Procedure (Step 110) is not necessary if the desired partitioning Procedure (e.g. Steps 111, 112, or 113) has been selected or is otherwise known in advance, and the selection need not include all of the types.

Once the database has been partitioned among the plurality of processors in memory such that a local database is resident in at least two of the processors (and likely in each of the processors), each processor builds a local ε-kdB tree (Step 120). These tree builds, which are constructed in parallel among the plurality of processors, are followed by the Intersected Regions Procedure (Step 130) where each processor determines or identifies those other processors with which it needs to exchange or share data. Exchanging data is typically performed by copying or duplicating points so that each processing element has a copy for its internal use. Finally, the similarity join procedure (Step 140) is performed to generate one or more sets of multi-dimensional object pairs (Step 150).

These multidimensional database object pairs reside in memory (for example, RAM and/or disk) and may be used in decision analysis, control physical systems, modify other databases, be displayed on a display screen, serve as warnings, buy/sell indicators, and any other manner of uses. In the exemplary embodiment of the procedure illustrated in FIG. 4, the similarity join output database is illustratively shown as being used to provide diagnosis and treatment decisions and control, including for example delivery of drugs based on measured patient temperature, heart-rate, blood chemistry work-up (Step 103) as well as prior historical treatment data for that and/or other patients (Step 102). In this situation, the similarity join acts as a sort of artificial intelligence control agent. Of course this is only one example of the application. Other applications might include real or pseudo-real time formulation, placement, and execution of buy/sell orders on a computer network to stock, bond, or commodity markets, or the joined objects may be displayed on a display screent device, sucn as a computer monitor or on paper.

After some description of an ε-k-d-B tree and Sequential Similarity Join, each of the procedures and subprocedures which form the overall inventive method is described in greater detail so that the overall inventive similarity join structure and method may be more readily understood.

Building The ε-k-d-B Tree

In this section, we first summarize the construction of the ε-k-d-B tree and the similarity join procedure as originally described by Shim et al in "High-dimensional Similarity Join" in Reference [2]. The "epsilon" (ε) enhancement to the k-d-B tree data structure is nominally a data structure that is optimized for performing similarity joins relative to earlier data structures. The ε-k-d-B tree described by the authors in [2] is purported to have a very small build time to thereby allow the ε-k-d-B tree to use the similarity distance limit ε as a parameter in building the tree. Previous to this enhancement, when a large database is involved, it may not be possible to hold the entire database or tree in main-memory at the same time; however, reference [2] describes two procedures for partitioning the data. A first procedure partitions the data using one partitioning dimension to divide it into 2ε chunks. If these 2ε chunks are too large to fit into main memory, then a second procedure is used to divide the data into $4\epsilon^2$ chunks, in which the number of data points in each chunk is more likely to fit into main memory. The extension is made practical by the relatively small build time for the ε-k-d-B tree. Reference [2] pertains only to a sequential procedure and does not provide the advantages of the inventive parallel procedures described herein.

Figure 5:
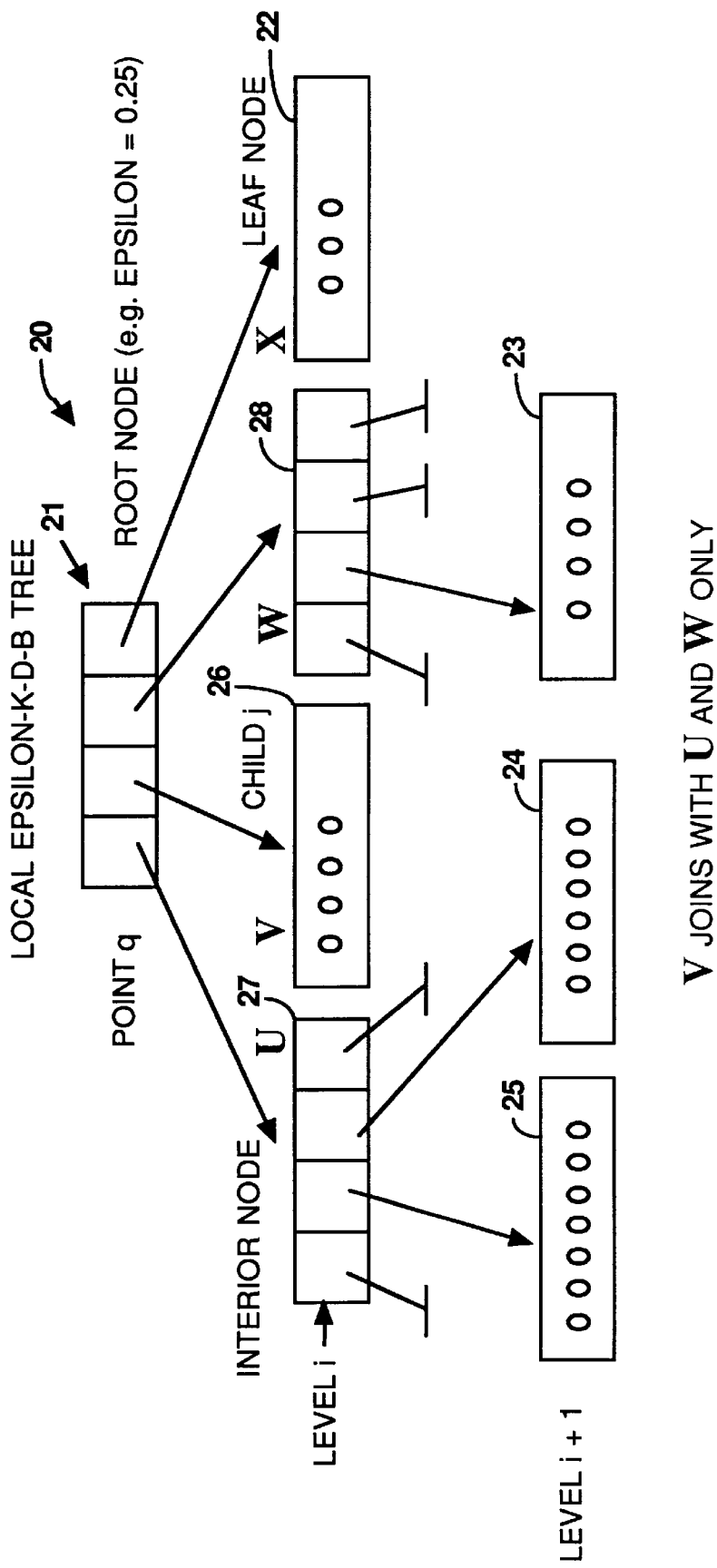
FIG. 5 is a diagram showing a procedure for building the local ∈-k-d-B tree.

An exemplary embodiment of a procedure for building the tree is now described relative to FIG. 5 which shows an exemplary local ε-k-d-B tree. The term "local" refers to the tree built within each processing element, while the term "global" refers to the database and related data structure as a whole. The local ε-k-d-B tree procedure is applied on the set of points in each processor 72 with processing element 71,91 locally. For simplicity of description, assume without loss of generality that the coordinates of the points along each dimension belong in the range between 0 and +1 (e.g. [0 . . . 1]). We start with an initialized or empty leaf node as the root node 21 and then each point is added one by one. (See also FIGS. 11 and 12) For each point $q=(q_1, q_2 \ldots, q_d)$, traverse the tree starting from the root node 21 until a leaf nodex(e.g. 22, 23, 24, 25, 26) is reached. At an internal (interior) node (e.g. 27, 28) at level i, a child j will be part of the traversing path if the ceiling of $q_{di}/\epsilon$ is equal to j, that is if $$\left\lceil \frac{q_{d_i}}{\epsilon} \right\rceil = j,$$

where q is a point that is being inserted into the tree, $d_i$ is a particular $i^{th}$ dimension used to split the tree at level i of tree 20, $q_{di}$ gives the value the component of point q along the $d_i$ dimension, and j is the $j^{th}$ child of node x. A leaf node is converted to an internal node with floor[$1/\epsilon$] child nodes whenever the number of points in the leaf node reaches some predetermined threshold number of points and there is an unused dimension. Note that the notation "[g]" means the "ceiling of g", where the ceiling of g is the nearest larger integer, and that the notation "⌊g⌋" in these equations means take the "floor of g, where the "floor" is the nearest integer less than g. For example, "ceiling of 5.5 equals 6", or ⌈5.5⌉=6. The points of the new internal node are inserted into its child node based on some chosen dimension. A unique dimension is chosen for each level of the tree based on predetermined rules.

The inventive similarity join procedure 100 uses the ε-k-d-B tree in order to identify all pairs of points that may be within ε distance of each other for some $L_p$ metric. As illustrated in FIG. 5, this tree has the property that points in a particular child j need to be joined only with the points in the adjacent siblings and in itself in order to identify all pairs of points that may be within ε distance for some $L_p$ metric. With respect to the exemplary tree representation in FIG. 5, for node V 26, only the adjacent siblings U 27 and W 28 can contain points within ε distance of any points in V. This is true for any $L_p$ distance metric. No other siblings can contain points within ε distance of points in V.

The ε-k-d-B tree has several characteristics. First, the cost of building the tree is relatively small because the splitting procedure, that is the procedure for taking a leaf node and converting it to an internal node and subsequently putting all points from the previous leaf node into that new leaf node, is simple. Second, it is space efficient since there is no need to store any information in the internal nodes (e.g., region boundaries). Third, the ε-k-d-B tree traversal cost is relatively inexpensive, partially due to the simplicity of the splitting procedure and also partially due to the property of the tree that the space is partitioned into non-overlapped regions. Finally, the number of neighboring nodes does not depend on the number of dimensions as long as not all the dimensions are used for building the tree. Subsequent sections describe the manner in which these properties are advantageously employed to accomplish the inventive structure and method.

Parallel Partitioning Procedures for Similarity Join (Step 106)

Parallel computing architectures having a set (two to a few thousand) of processors or processing elements connected through an interconnection network are known, and various types of interconnection network are also known in the art. The multiplicity of processors may be physically close or even within the same machine, or may be remotely located. The computer architectures may be coarse grained, that consists of some number of larger processors (such as the current Intel Pentium CPU Pentium II CPU, the Advanced Micro Devices CPU, or Cyrix CPU, for example), or be fine grained, that consists of a larger number of smaller processor on one or more chips. These coarse grained parallel machines have primary memory such as RAM physically distributed across and among the processors and secondary memory, such as disk or other bulk storage, may also be associated with each processing element. Some memory may also be shared globally across the plurality or multiplicity of processors. Interprocessor communication is typically either through message passing or through a shared address space in memory. The parallelization of the inventive method on such machines is now described, however, those workers having ordinary skill in the art will appreciate that the inventive method is not restricted to implementation or operation only on these exemplary interconnected parallel machines, such as those described relative to the FIG. 1 and FIG. 2 embodiments.

In this section, three embodiments of the inventive method for parallelization of the similarity join procedure are described. By parallelization, we are performing the similarity join (or at least portions of the similarity join) simultaneously and in parallel on a plurality of processors.

The first embodiment is the Partition Quantiling (PQ) embodiment which uses the entire data set to partition the space into P disjoint regions and uses the total number of points in the region as the load metric. The second embodiment is referred to as the Parallel Weighted (PW) embodiment, and improves load balancing for data sets having other than a uniform distribution, such as for example, a skewed distribution, by using the (estimated) number of join tests required as the load metric. The PW procedure incorporates a variation of the PQ procedure within itself. Independent of which partitioning procedure is used, each of these similarity join embodiments include four main functional or procedural phases.

These four phases are shown in the flow-chart diagram of FIG. 4, and references to "step" refer to the step reference numerals in the diagram. Phase 1 pertains to partitioning the data points among the processors (Step 106) including choosing (Step 110) between the PQ procedure (Step 111), the PQEST Procedure (Step 112), and the PW procedure (Step 113). Phase 2 pertains to building local $\epsilon$-k-d-B tree using the local data points (Step 120). Phase 3 pertains to retrieving non-local regions required for local join processing, also called the regions phase (Step 130). Phase 4 pertains to performing a join for local data points using local as well as non-local points received in Phase 3, also called join phase (Step 140). Each of these procedural phases are described in additional detail in paragraphs to follow. We first describe an overview of the partitioning procedure.

The parallel-similarity join of data set DS begins during the first partitioning phase by partitioning space into disjoint regions (Step 105) using selection procedure (Step 110) to select between the PQ (Step 111), PQEST (Step 112), or PW (Step 113) procedures. These disjoint partitioned regions represent the global part of the parallel $\epsilon$-k-d-B tree. Ideally, the regions should be assigned to the processors such that the load across the processors is balanced, that is, each processor has the same load generally corresponding to having an equal work load including comparison operations and computational operations.

In the PQ Procedure, an attempt to attain work load equalization is made by allocating an (approximately) equal number of points to each processor. For a uniformly distributed data set, approximating the computational load based on the number of points is a reasonable approximation; however, for nonuniformly distributed data sets such as data sets having skew, a point-number based partitioning scheme, even one having the advantages of the inventive PQ Procedure is suboptimal relative to the inventive weighted partitioning (PW) procedure.

In the inventive PW Procedure, the computational load balancing concern is addressed by taking into account the distribution of points to assign a weighting value to each point. These weights influence the manner in which the data set is partitioned so that processors responsible for higher computational burden points may generally be allocated fewer points than processors allocated low computational burden points. Also, since the PW procedure is more efficient, a more accurate, but possibly more time consuming quantiling procedure, may be used to achieve better load balancing without increasing the overall completion time.

The PQEST Procedure uses the number of points as the load mebrie but is a faster implementation in that it determines the partitioning scheme based on a sample set of points instead of the entire set, and then redistributes the points only once. In any event, strict or absolute balancing is not required. (Schemes for selecting between PQ, PQEST, and PW to achieve balancing across multiple processors are discussed hereinafter.)

The local $\epsilon$-k-d-B tree is built in the second phase (Step 120) and is the same for the PQ, PQEST, or PW partitioned space. Since each processor normally will require non-local data to perform the similarity join computation, during phase III (Step 130), each processor determines or identifies the other processors with which it needs to exchange some data points. Each processor also computes the subregions it needs to communicate with. Additional data structures, including data structures for the Level list and SimpleLevel list used to construct intersecting regions lists (described in connection with the Regions Phase), may be required for this data exchange related computation. The similarity join procedure (Step 140) is performed on the local tree and on the tree having non-local regions, to obtain all pairs of points within the $\epsilon$ distance.

The similarity join computation is desirably performed such that duplicate point pairs, for example, the pairs (a,b) and (b,a) are not generated since they contain the same information independent of the point ordering within the pair. The manner in which the inventive parallel similarity join is performed is described in greater detail in subsequent sections. However, we first identify several areas which desirably receive attention for effective similarity join parallelization, including: (a) distribution of data points among processors to achieve load balance as well as to minimize interprocessor communication; (b) generation of the communication required; and (c) for a potential result point (a, b) such that a and b belong to different processors, the computation can be performed either on the processor which owns "a" or on the processor which owns "b". For data sets with skew, this can result in substantial load imbalance even assuming that the computation that requires only local data points is well balanced. (It is possible to perform this computation on a processor which does not own either a or b; however, this option is less desirable as it may result in extra interprocessor communication associated with a new third processor without significantly affecting the load balance.)

Data Partitioning Procedure

Figure 6:
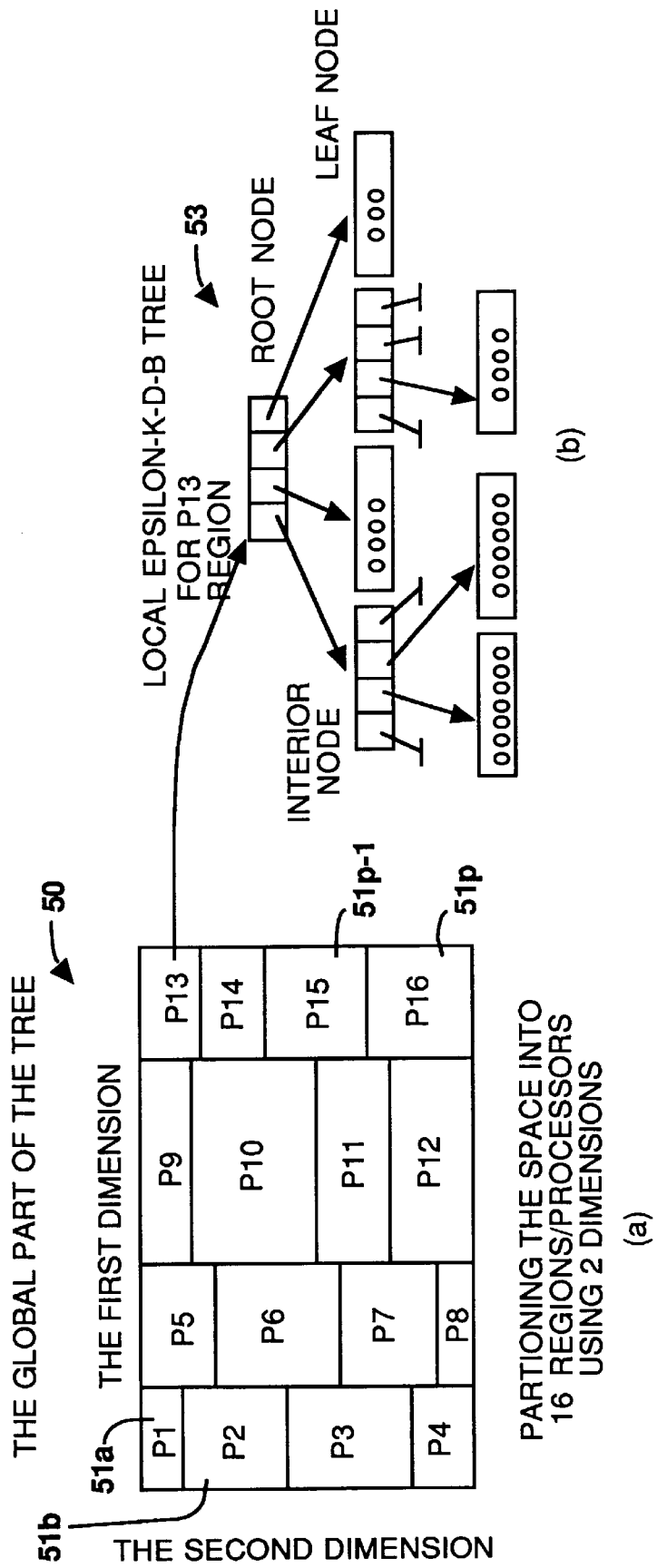
FIGS. 6(a) and (b) are diagrams showing an exemplary embodiment of a procedure of partitioning the data across a plurality of processors, including the manner in which the global part of the tree is partitioned, and the relationship between the global part of the tree and the local ∈-k-d-B tree.

An exemplary embodiment of the inventive method of partitioning the data across several processors assuming that there are a number n of d-dimensional points assigned among a number of P processors is now described relative to FIG. 6. FIG. 6a illustrates the manner in which the global part of the tree is partitioned, and FIG. 6b illustrates the relationship between the global part of the tree and the local ε-k-d-B tree.

As shown in FIG. 6, the global part of the tree 50 is built by assigning disjoint subsets of points 51a, . . . , 51p to each processor where the "PX" nominally corresponds to the processor where "X" is the processor number (for example, the designation P1 refers to the region processed by processing element 1) allocated the points in the region. Each subset of points 51 corresponds to a region in the database space. To achieve this distribution among processors, the space is partitioned into P regions. Each of these P regions is assigned to a unique processor, such that: (1) load balance is achieved among the processors based on some load balancing metric; and (2) data locality is preserved such that the amount of communication between processors needed in the following phases (Phases II, III, and IV) is minimized. Preservation of data locality refers to the attempt to maintain data in a particular machine when data access is required so that exchange of data between machines can be minimized.

It is desirable to both minimize the work (including the load balancing aspect) and minimize interprocessor communication (data locality aspect). The overall time is the maximum computational time for any particular processor. The total time is the sum of the time for the load balancing plus the rest of the time for computation based on the load balancing distribution/partitioning. Therefore, expending an amount of time for load balancing is justified only if it will reasonably reduce the total time. Practically speaking, a reasonable or substantial degree of load balancing is acceptable, and absolute balancing among the P processors is not required. The amount of load balancing will typically vary with the database and problem instance. Even if the processor loading varies by 5% to 10%, 20%, 50% any range in between or more—the inventive methodology may still be advantageous over conventional approaches. Even load variations of 100% or more may be acceptable. The goal is that the overall time be minimized, so that there is a desire that the load variation between processors be small but a simultaneous desire that the load balancing attempt not take too much time. As illustrated in FIG. 6, the region associated with processor P3 has a corresponding local ε-k-d-B tree 53, as do each of the other regions of the global part of the tree. The structure of the ε-k-d-B tree 53, has already been described relative to FIG. 5.

Quantile Data Partitioning (PQ) Procedure without Weighting

Figure 7:
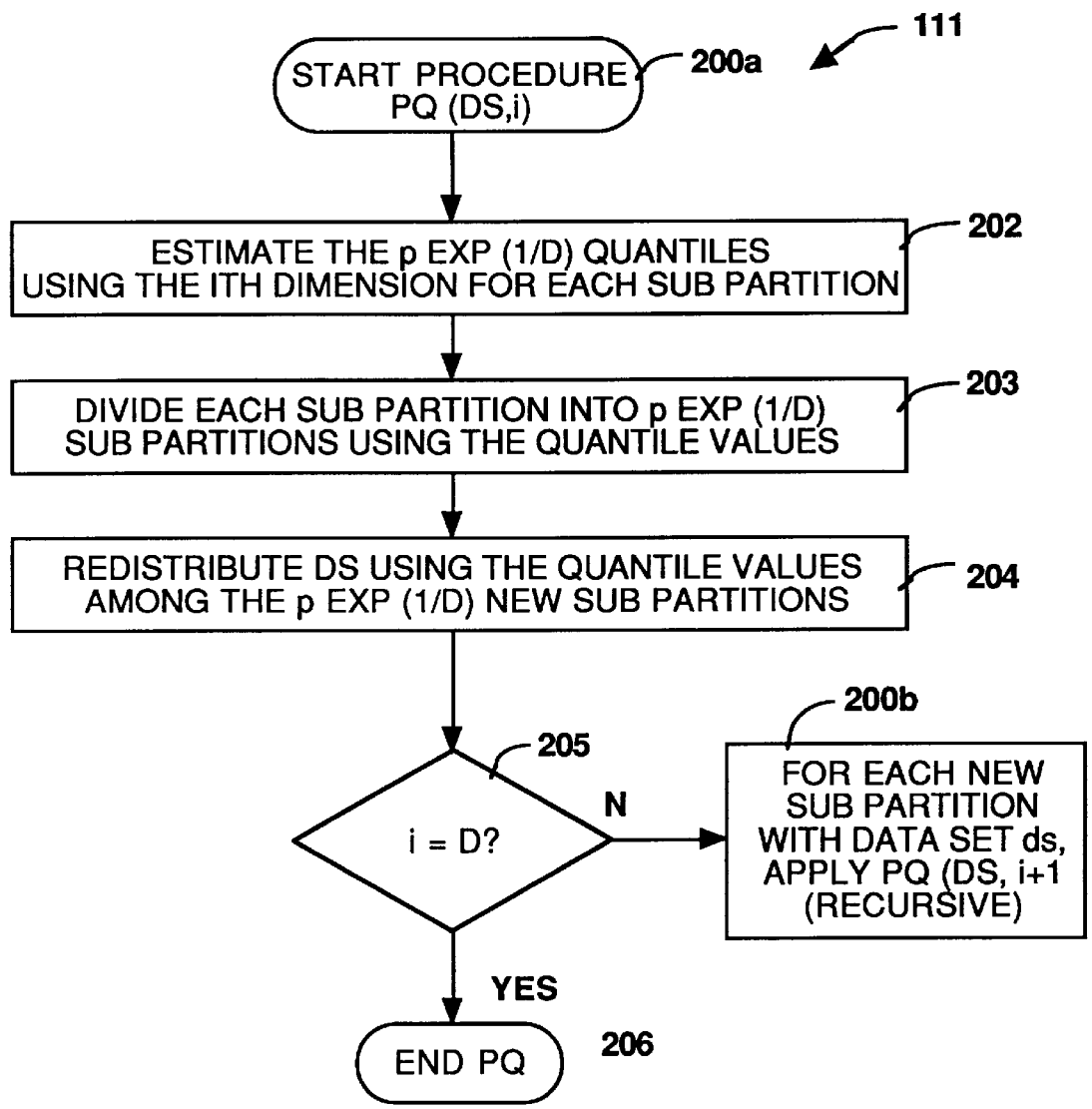
FIG. 7 is a top-level diagrammatic flow-chart description of an exemplary embodiment of the Quantile Partitioning (PQ) Procedure which uses the entire data set to determine quantiles for partitioning the dataset space into a number of disjoint regions and subregions or partitions.

A high-level description of the partitioning procedure based on quantiling where the number of points per processor is the primary load balancing metric is shown in the flow chart diagram in FIG. 7 showing the Partitioning based on Quantiling (PQ) procedure 111. This procedure uses the entire dataset to partition the space into p disjoint regions. The PQ procedure uses D partitioning dimensions (where $D \geq 1$) for partitioning the space. Note that uppercase "D" identifies the total number of dimensions used for partitioning the data across the processors, while lower case "d" refers to the total dimensionality of the points in the data set, such that $D \leq d$. Also, recall that $d_i$ is a particular ith one of the d dimensions.

In an exemplary embodiment, an equi-depth histogram is generated with z histogram bins at every partitioning dimension D. This is done recursively for the number of dimensions D, to generate z bins for each of the nodes in the tree. First, the P processors are assigned to z subsets of processors where each subset may contain one or more than one of the processors. Then the data is examined and partitioned into z data partitions. Each of the z data subsets is then assigned to one of the z subsets of processors in a one-to-one manner. This procedure is repeated recursively at the next dimension, until it has been performed for all D dimensions. The same dimension is used for all partitioning at the same level; however, a different dimension may be used to partition at different levels.

The equi-depth histogram may be generated by using a quantiling procedure, a known one of which is referred to here as One Pass Algorithm for Accurately Estimating Quantiles for Disk-Resident Data (OPAQ), which has been proposed in Alsabti et al. in reference [4] in which the φ-quantile of an ordered sequence of data values is the element with rank φ×n, where n is the total number of values. The One-Pass Algorithm for Accurately Estimating Quantiles for Disk-Resident Data (OPAQ) of Alsabti described in Reference [4] is now summarized as an aid to understanding the inventive PQ procedure.

Recall that the φ-quantile of an ordered sequence of data values is the element with rank φ×n, where n is the total number of values, and that the median of a set of data is the 0.5-quantile.

OPAQ is a procedure for estimating the φ-quantile (φ=1/h, 2/h, . . . , (h−1)/h) for large data sets where h is the number of quantiles, including for data sets in which the data size is larger than size of the memory so that the data is disk-resident. Furthermore, OPAQ has the following characteristics: (a) it requires only one pass over the data, (b) it is deterministic, (c) it produces tight lower and upper bounds of the true value of the φ-quantile, (d) it requires no a priori knowledge of the data distribution, (e) it has a scalable parallel formulation, and (f) the additional time and space complexity for estimating each additional quantile beyond the first one is constant per quantile.

Both sequential and parallel OPAQ procedures are provided. The sequential OPAQ procedure for estimating φ-quantiles is described first. The following terms are used in the description: size of the main memory (M), size of each run (m), total number of elements (n), number of runs (r=n/m), size of the sample for each run (s), quantile fraction (φ, where φ∈[0 . . . 1]), index or rank of the quantile (α=φ×n), value of the quantile ($e_\alpha$)

The OPAQ procedure consists of two phases: sampling phase and the quantile finding phase. In the sampling phase, the entire data set is input as r runs. A set of sample points $S=[s_1, \ldots, s_s]$ of size s is determined where $s_i <= s_{i+1}$, for i<s, for each run. The r sample lists are merged together forming a sorted sample list of size rs. The sorted sample list is used in the quantile finding phase to estimate the upper and lower bounds of the true value of φ-quantile. The accuracy of the result depends on both the phases.

Figure 8:
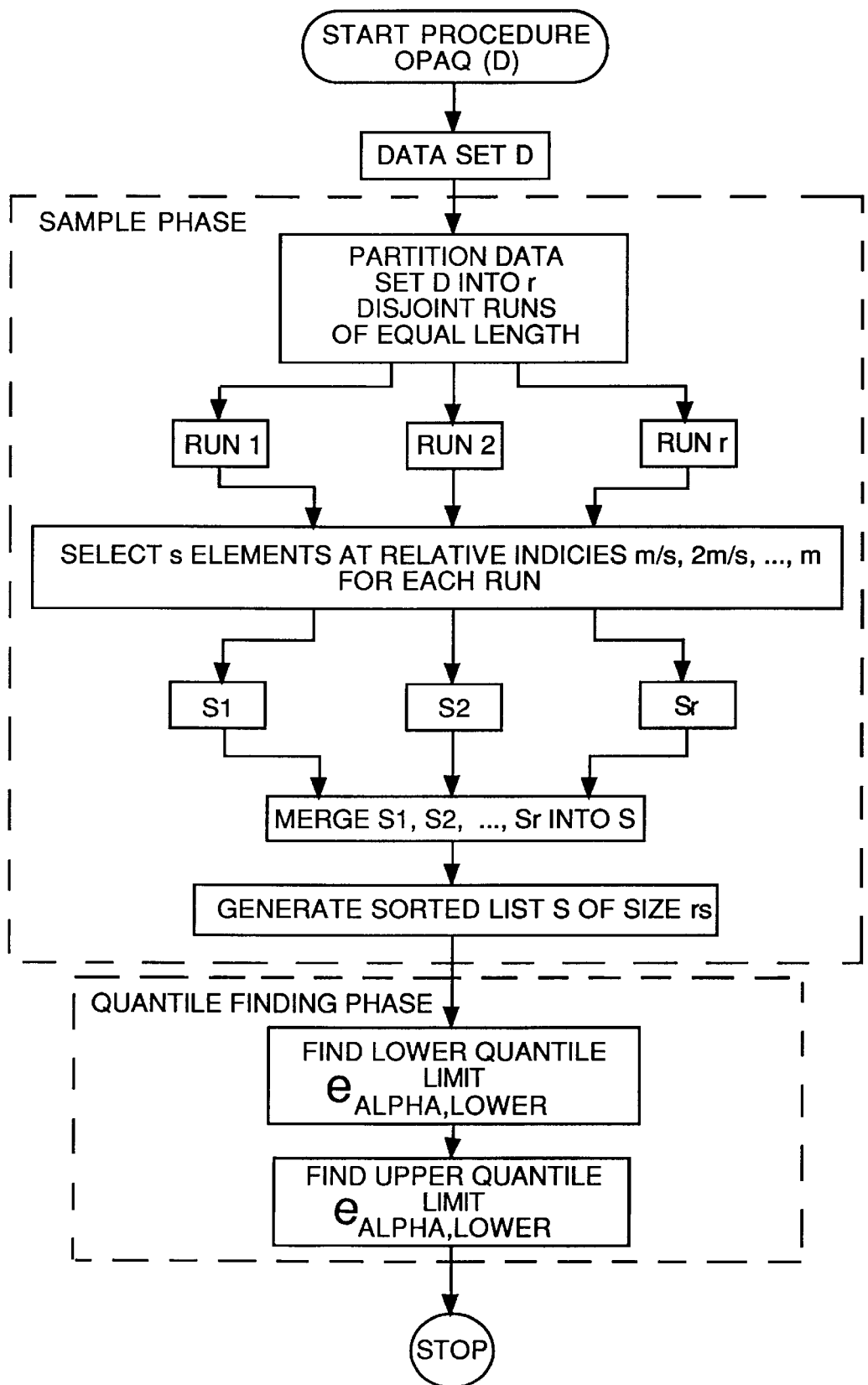
FIG. 8 is a top-level diagrammatic flow-chart of the One-Pass Algorithm for Quantiles (OPAQ) Procedure which may be used in the inventive PQ, PQEST, or PW Quantiling Procedures.

The Sample Phase is described relative to FIG. 8 which provides a top-level diagrammatic illustration of the sampling phase in which the data set D is of size n, each run is of size m, and s sample points are derived from each run. To estimate the quantile value ($e_\alpha$), an upper bound $e_\alpha{}^u$ and a lower bound $e_\alpha{}^l$ are determined such that $e_\alpha \in [e_\alpha{}^l, e_\alpha{}^u]$ and the number of elements in the interval $[e_\alpha{}^l, e_\alpha{}^u]$ is bounded. The samples are selected using the regular sampling [24]. A sample of size s consists of the elements at relative indices m/s, . . . , s(m/s). Each sample point s corresponds to m/s points less than or equal to the sample point and greater than or equal to the previous sample point. The term "sub-run" of the sample point is used to denote these elements.

The problem of finding a sample point at index k is the same as finding the $k^{th}$ smallest element in the given run. The problem of finding the $k^{th}$ smallest element in a set of data is known as the "selection" problem. Many procedures have been proposed to solve the selection problem. Some of these procedures are deterministic and others are probabilistic and are described further in Reference [4].

The s sample points are found as follows. (Assume that s and m are powers of 2. If they are not, it is easy to modify the procedure slightly and maintain the same complexity.) First, find the median of the m elements and divide the list into two equal parts. Then, find the medians of the new two sublists, and so on until the sizes of the sublists reach m/s. The sizes of the sublist will be m/s after log s iterations. After log s iterations, there will be s sublists each of size m.

The maximum element of sublist i is the $i^{th}$ sample point and it can be found in O(m/s). Using results in [25], one can find the s sample points in O(m log s) worst-case running time. The randomized procedure for selection can be extended to find the s sample points in O(m log s) expected time and $O(m^2)$ worst case time. This procedure has small constant and is practically very efficient. After finding the r sample lists, they are merged together to form one sorted sample list of size rs.

The quantile finding phase involves finding the quantile lower and upper bounds, $e_\alpha{}^l$ and $e_\alpha{}^u$, using the sorted sample list. As a result of using regular sampling method in deriving the sample points, it can be easily shown that the sample points have the following properties: (a) there are at least im/s elements less than or equal to the sample point $s_i$; and (b) there are at most r−1 sub-runs each with at most (m/s)−1 elements less than $s_i$. Thus the maximum number of elements less than $s_i$ is given by the expression i(m/s)+(r−1)(m/s−1). These properties are used to determine the lower and upper bounds of the quantile values, $e_\alpha{}^l$ and $e_\alpha{}^u$.

Let List be the list of sorted samples. Assign $e_\alpha{}^l$ to be the ith element in the sorted samples list and it follows that:

$$e_\alpha{}^l = \text{List}[\lfloor (s/m)\alpha - (r-1)(1-s/m) \rfloor].$$

Similarly $e_\alpha{}^u$ is the jth element in the sorted samples list, and it follows that:

$$e_\alpha{}^u = \text{List}[\lceil (s/m)\alpha \rceil].$$

Reference [4] shows that: (1) The maximum number of elements between the true quantile and the quantile lower bound ($e_\alpha{}^l$) is n/s. (2) The maximum number of elements between the quantile upper bound ($e_\alpha{}^u$) and the true quantile is n/s. (3) The maximum number of elements between $e_\alpha{}^l$ and $e_\alpha{}^u$ is less than or equal to 2(n/s).

An additional advantage of the procedure is that the sample phase does not depend on the quantile phase. The same sorted sample list can potentially be used for finding other quantiles. Reference [4] also describes timing considerations and requirements for each of the sequential and parallel quantile procedures.

Parallel Quantiling is described relative to an exemplary structure or machine architecture which consists of a small set of processing elements (for example, two to a several thousand) connected through an interconnection network. These coarse grained parallel machines have memory physically distributed across the processors, and where interprocessor communication is either through message passing or through a shared address space.

Rather than making specific assumptions about the underlying interconnection network, we assume a two-level model of computation. The two-level model assumes a fixed cost for an off-processor access independent of the distance between the communicating processors. A unit computation local to a processor has a cost of δ. Communication between processors has a start-up overhead of τ, while the data transfer rate is 1/μ. For the complexity analysis it was assumed that τ and μ are constant, independent of the link congestion and distance between two nodes. This permits use of the two-level model and view the underlying interconnection network as a virtual crossbar network connecting the processors. The procedure is relatively architecture-independent and can be efficiently implemented on other interconnection networks.

We assume that each processor is assigned n/p elements from the data set. The parallel procedure also has two phases: the sample phase and the quantile phase. The number of runs per processor, r, equals n/pm. The sample phase of the parallel version is very similar to the sample phase of the sequential version. An additional step is required at the end for merging the local sample lists of all the p processors to form one global sorted sample list. The procedure for merging p lists generally depends on the underlying interconnection network of the parallel machine, the size of lists to be merged and the number of processors. The Bitonic merge and Sample merge procedures may be used and are variations of the Bitonic sort [26, 27]; and sample sort [24, 27]. The only difference between Bitonic/sample sort and Bitonic/sample merge is that initial sorting step is not required because the local lists are already sorted.

By merging the p sample lists, a globally sorted sample list is formed of size prs such that processor i will have $s_{rsp}, \ldots, s_{rsi+rs-1}$ elements. The quantile phase in the parallel version of the procedure is very similar to the corresponding one in the sequential procedure. The only difference is in number of the total runs. In the sequential procedure, the number of the total runs is r, whereas the number of the total 30 runs in the parallel procedure is rp. We can estimate the parallel procedure upper and lower bounds of φ-quantile by using the formulas already described but by substituting rp for r in the sequential expressions, to arrive at the expressions for the lower and upper parallel bounds: $e_{\alpha par}{}^l = \text{List}[\lfloor (s/m)\alpha - (rp-1)(1-s/m) \rfloor]$, and $e_{\alpha par}{}^u = \text{List}[\lceil (s/m)\alpha \rceil]$.

The time requirement of the parallel procedure is the sum of the time required for each of the following steps: (a) reading the n/p elements from the disk locally, (b) finding the rs sample points locally, (c) merging the r sample lists locally, (d) merging the p sample lists globally, and (e) estimating the value of the φ-quantile. Reference [4] describes these complexity and timing characteristics in greater detail.

OPAQ generates a good bounded approximation of an equi-depth histogram using one-pass over the entire data set. A characteristic of the OPAQ procedure is that it guarantees that each sub-region will have at most (n/z+n/s) points and at least (n/z−n/s) points, where s is the OPAQ sample size parameter of the OPAQ procedure, z is the number of bins, and n is the number of points in the data set.

While the OPAQ Procedures have been described as an applicable exemplary procedure for the PQ, PQEST, and PW Procedures, other quantiling procedures may be used in connection with the inventive method.

An embodiment of the PQ procedure (Step 111 in FIG. 4) is diagrammatically illustrated in greater detail in the flow chart of FIG. 7. Recall the database space has been divided or partitioned into a plurality of non-overlapped regions, referred to as subregions, and that each subregion has one or more processors. The number of processors is determined as follows. At the first level, the processors are divided or allocated so that there are P/z processors in each subregion. At the second level this is repeated so that there are $P/z^2$ processors, and so on until at level D there are $P/z^D$ processors. (Note that at level D there is one (1) processor per subregion.) More generally, then there are $P/z^\ell$ processors in each subregion at level $\ell$.

In the PQ Procesure, first, the $p^{(1/D)}$ quantiles are estimated using the $i^{th}$ dimension for each subregion (Step 202). After estimating the quantiles applicable to each subregion, each subregion is divided into $p^{(1/D)}$ subpartitions using the estimated quantile values (Step 203). Then, the dataset (DS) is redistributed among the $p^{(1/D)}$ new subpartitions using the quantile values (Step 204). The points are redistributed among the sub-regions such that each processor belonging to a sub-region j will receive approximately the same number of points as other processors in other sub-regions. A point having d dimensions ($q_1, q_2, \ldots, q_d$) is assigned to sub-region j, where j is the lowest value satisfying the condition that the first dimension of point q (that is $q_l$) is less than or equal to the $j^{th}$ quantile ($Q_j$), that is $q_l \leq Q_j$ (assuming that the first dimension $d_i$ is used first for partitioning the space among processors). After the redistribution (Step 204), a comparison is made to determine whether the current $i^{th}$ dimension is equal to the highest dimension of the points (D) (Step 205), and if it is equal, the PQ procedure ends (Step 206), and if not equal, then the PQ procedure (Step 200*b*) is applied to each new subregion with the incremented ith dimension, that is for PQ(ds,i+1). (Note that Steps 200*a* and 200*b* refer to the same procedure executed for different data.)

In each of the iterations of the PQ procedure, the same process is performed recursively (iteratively) in each sub-region using a selected unused common dimension. After recursion or iteration i, there will be $p^{i/D}$ sub-regions, where each subregion has $p^{(D-i)/D}$ associated processors to perform the operation.

A high-level description of the PQ procedure (Step 200) is presented in the pseudo code representation below:

---
*function* Partitioning (Step 200)
    for i = 1 to D do
        for each partition *do in parallel*
            Estimate the $z = p^{i/D}$ quantiles using the $i^{th}$ dimension in each partition.
            Redistribute the points using the quantile values.

---

The Cost C of the inventive PQ procedure is proportional to the partition dimensionality D. Partitioning along more dimensions will generally reduce the number of data points exchanged for retrieving non-local regions (Phase 3). However, it can also increase the number of processors with which each processor needs to communicate, thereby potentially increasing the costs for communication. Typically, D will be 1 or 2 in most practical scenarios for minimization of the overall time, but D may be made arbitrarily large and may take on values of 3, 4, 5, and so forth, so long as the partitioning dimension is less than the dimensionality of the points (i.e., D≦d).

The choice of particular dimension used for partitioning the space also affects the performance of the local ∈-k-d-B tree build, non-local region retrieval, and join phases. Advantageously, one would prefer to use the dimensions which have the least amount of skew, as well as the least amount of correlation among them. Also, choosing dimensions with nearly uniform distribution of points will typically reduce the cost of the remaining phases.

The quantile procedure may also be used to estimate the skew along the dimensions as follows so that the most efficient dimension may be used for subsequent partitioning. In the beginning of iteration i, the quantile values along all unused dimensions are estimated, or some subset of them, and the distance metric between the quantile values is used to estimate the skew for each of these dimensions. The dimension which has the lowest skew is then selected as the dimension to be used for partitioning during the current recursion level or iteration as indicated in the pseudo-code. In some instances, the overheads associated with generating pre-partitioning quantiles along more than one dimension to select an optimum dimension, may outweigh the potential benefits so that the approach of using a different dimension for each iteration may be sub-optimal when the entire process is considered.

For the partitioning described up to now, note that the global part of the tree does not necessarily have the characteristics of the ∈-k-d-B tree since e has not been taken into consideration while performing the partitioning, rather each of the partitions have merely been divided into $p^{1/D}$ sub-partitions.

As an alternative embodiment, instead of using $p^{1/D}$ sub-regions for each dimension of the global partitioning, a variable number $z^\ell$ of sub-regions may be chosen. The number of bins at each level $\ell$, or $z_\ell$, may be different for each level and is chosen at each level to be the largest value such that any adjacent quantile values are at least e apart. In general, the total number of bins is the product of the number of bins at each level is given by the expression:

$$\prod_{i=1}^{D} z_i = z_1 \times z_2 \times \ldots \times z_{D-1} \times z_D$$

For example, one may choose to divide the dataset into different numbers of z-bins at each level so that the total number of partitions is equal to the total number of processors, but that the number of $z_\ell$-bins at each level are different. The PQ partitioning procedure implemented with $z_\ell$ sub-regions, one can ensure that the global tree has the characteristic of the ∈-k-d-B tree such that a sub-partition needs to be joined only with the two adjacent sub-partitions. Even with the same number of bins at each level, there will only be a need to join with neigbors, but the width of each bin can be much larger than ∈.

PQ$^{Est}$ Partitioning Procedure

Figure 9:
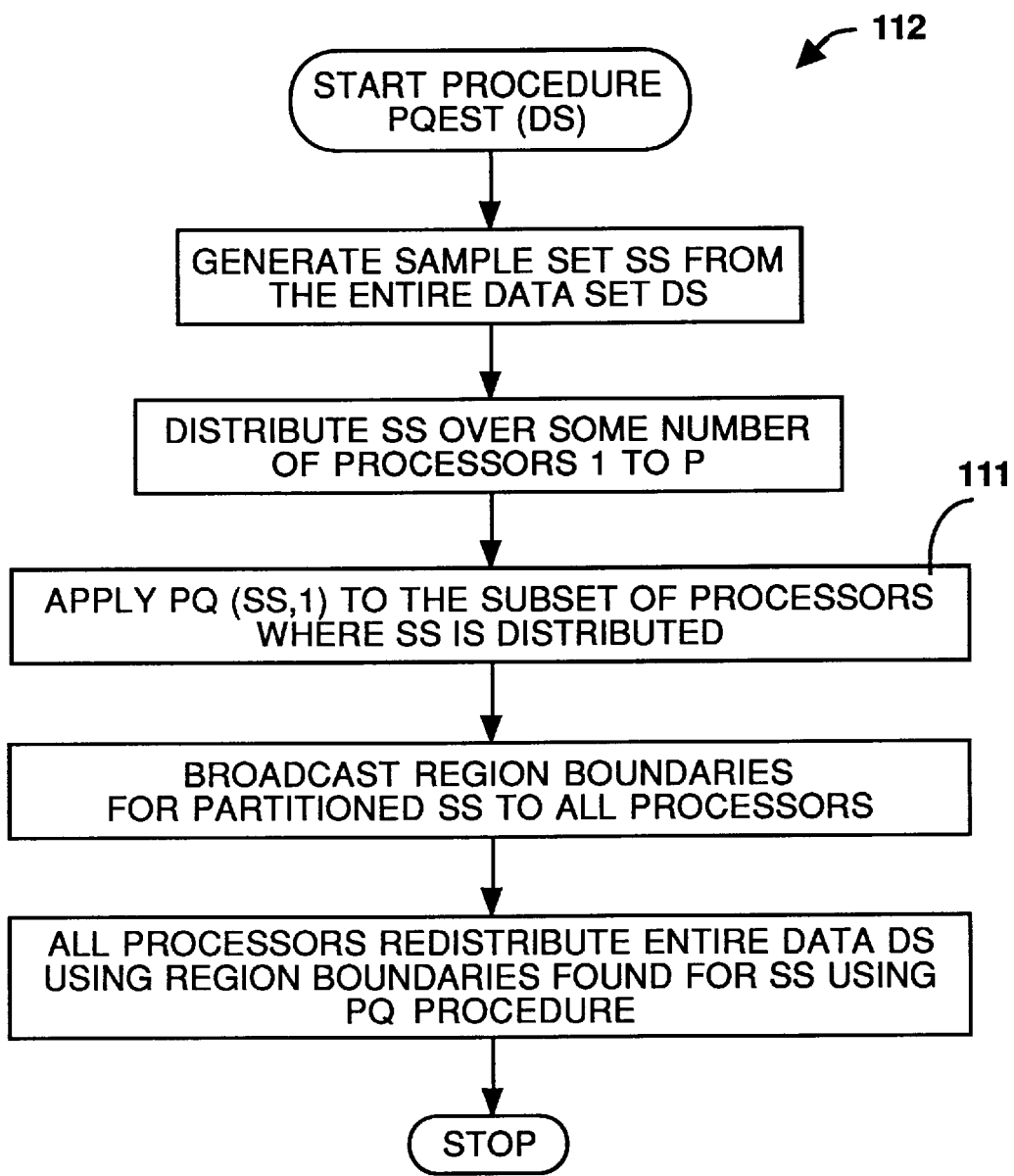
FIG. 9 is a diagrammatic flow-chart showing an embodiment of the PQEST Procedure

In the exemplary PQ embodiment, the data points are redistributed D times among the p processors according to the dimensionality of the points. This redistribution process may require a relatively large amount of interprocessor communication time. The number of iterations for redistributing the data points can be reduced to a single iteration in one particular PQEST alternative embodiment of the inventive method by approximating the quantiling portion of the PQ procedure by random sampling the data set. A diagrammatic flow-chart showing an embodiment of the PQEST Procedure is illustrated in FIG. 9. This random sample is used by the remainder of the PQ procedure to build the global part of the tree. The global part of the tree determines the processor sub-regions (e.g. P1, P2, . . . , P16, as in FIG. 6). After determining the processor regions, the entire set of data points are redistributed once only among the processors as for the PQ procedure. Typically, a sample size of from about two-percent (2%) to about ten-percent (10%) is appropriate. Sample sets of less than 2% (such as about 1%) may be used but such small sample sets may not be entirely representative of the full data set. For sample sets greater than about 10%, for example from 10% to 25%, there may be some marginal improvement but and the additional time associated with processing the larger sample set may not warrant the larger size.

PW Data Partitioning Procedure

The PQ procedure uses the total number of points in the data set as a load metric. The $PQ^{Est}$ procedure uses the same load metric as PQ but is more efficient (e.g. has a lower cost) because it determines the partitioning on a sampled set rather than on the entire data set. In the case of either the PQ or PQEST procedures, use of this number of points in each processor load metric may lead to poor load balancing in instances when the data set has a skewed distribution. By comparison, an alternative embodiment of the partitioning procedure referred to as the PW procedure uses the number of join tests as the load metric. Better load balancing is achieved because the most computation intensive part of the overall similarity join is generally the join test component.

Figure 10:
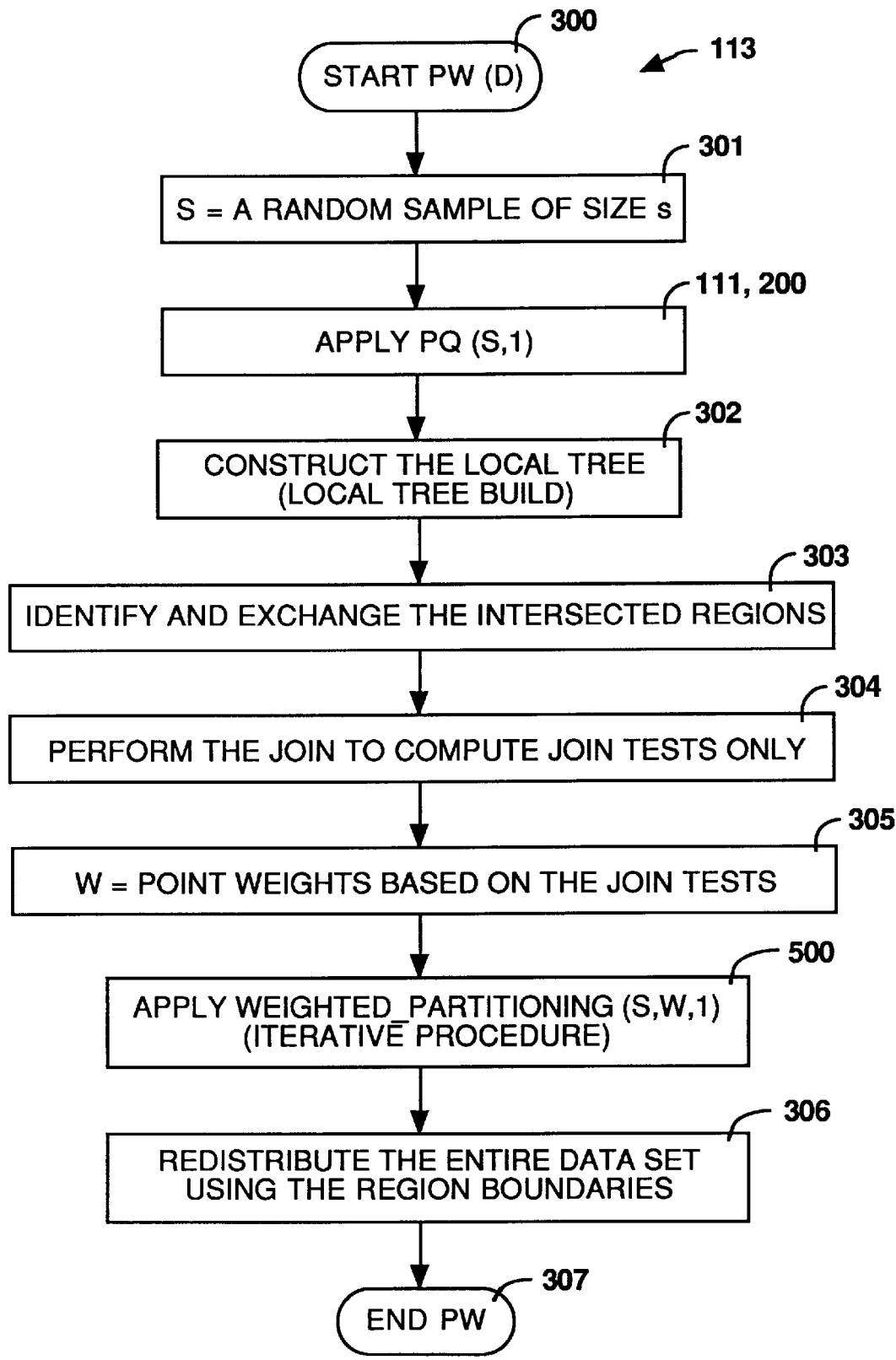
FIG. 10 is a diagrammatic flow-chart showing an embodiment of the overall PW Procedure.

The PW procedure partitions the space into p regions, each region having region boundaries, such that the amount of work or Cost (recall Cost=number of join tests+traversal costs) associated with points corresponding to each region is approximately equal. Computing the work load associated with a given point may require performing the entire similarity join (which is what we are parallelizing). First, however, we achieve this by first performing the similarity join computation (in parallel) on a small sample of the data of size s using the PQ partitioning strategy on that sample only. A top-level description of the PW partition phase is illustrated in the diagrammatic flow chart of FIG. 10 illustrating the overall PW procedure (Step 113).

First, a random sample (S) of the entire data set having size s is obtained (Step 301). Then the PQ procedure (already described) is applied to the random sample PQ(S,1) where the S refers to the sample data and 1 to the first level for partitioning (Step 111). On the basis of the partitioned random sample (PQ(S,1)), a local epsilon-k-d-B tree is constructed (Step 302), and the intersected regions are identified and exchanged among the processors (Step 303). Next, the join is performed only to compute the number of join tests (Step 304) but the joins are not actually performed, and point weights (W) are computed based on the number of join tests (Step 305) using the equation $W=f(pt)=rd+k3^{Depth}$ as described below. Once the point weights, W, have been determined, the Weighted Partitioning (PW(S,W,1)) Procedure (Step 500) is applied. Finally, the entire dataset is redistributed once among the plurality of processors using the region boundaries identified earlier (Step 306), thereby completing the PW procedure (Step 307).

Figure 11:
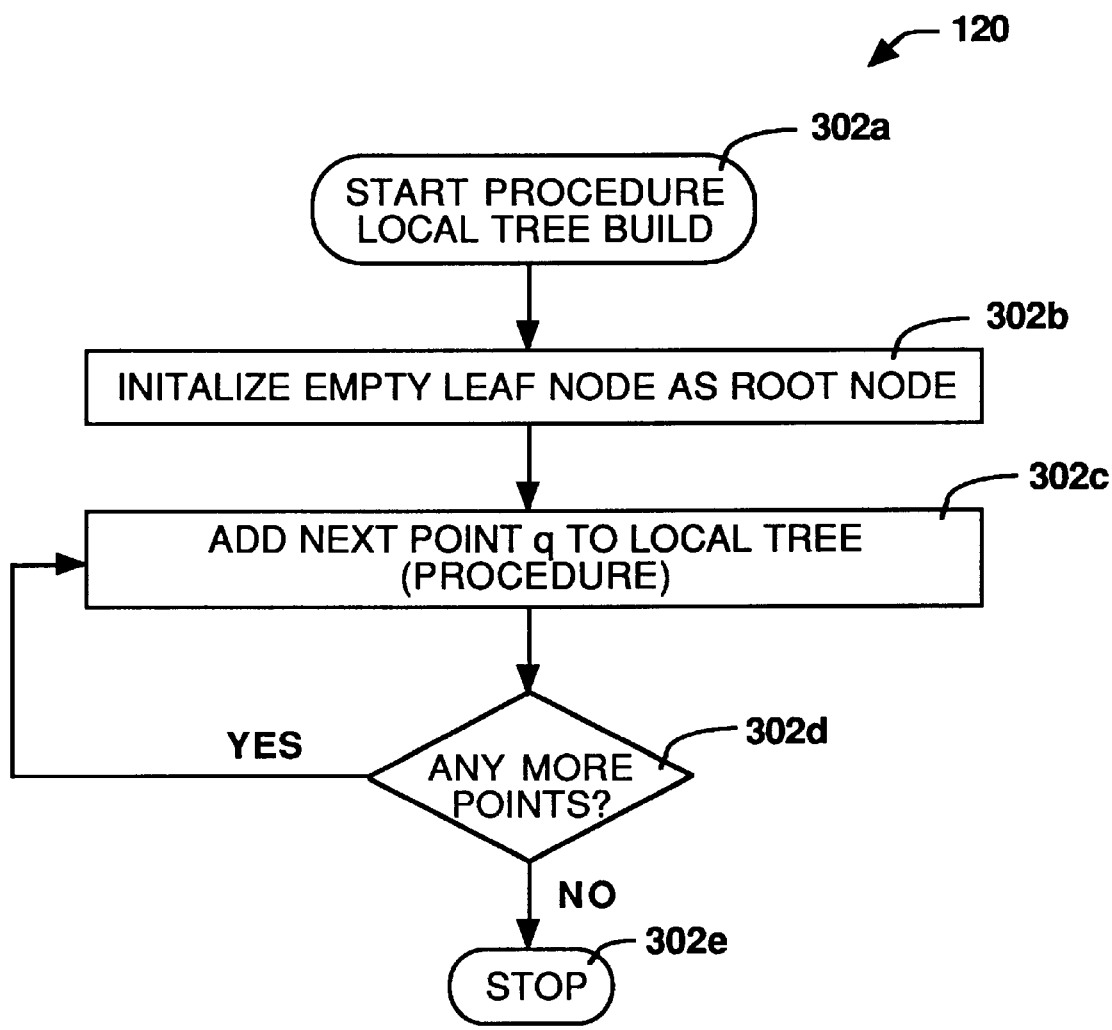
FIG. 11 is a diagrammatic flow-chart showing an embodiment of a Local ∈-k-d-B Tree Build Procedure within the PW Procedure of FIG. 10.
Figure 12:
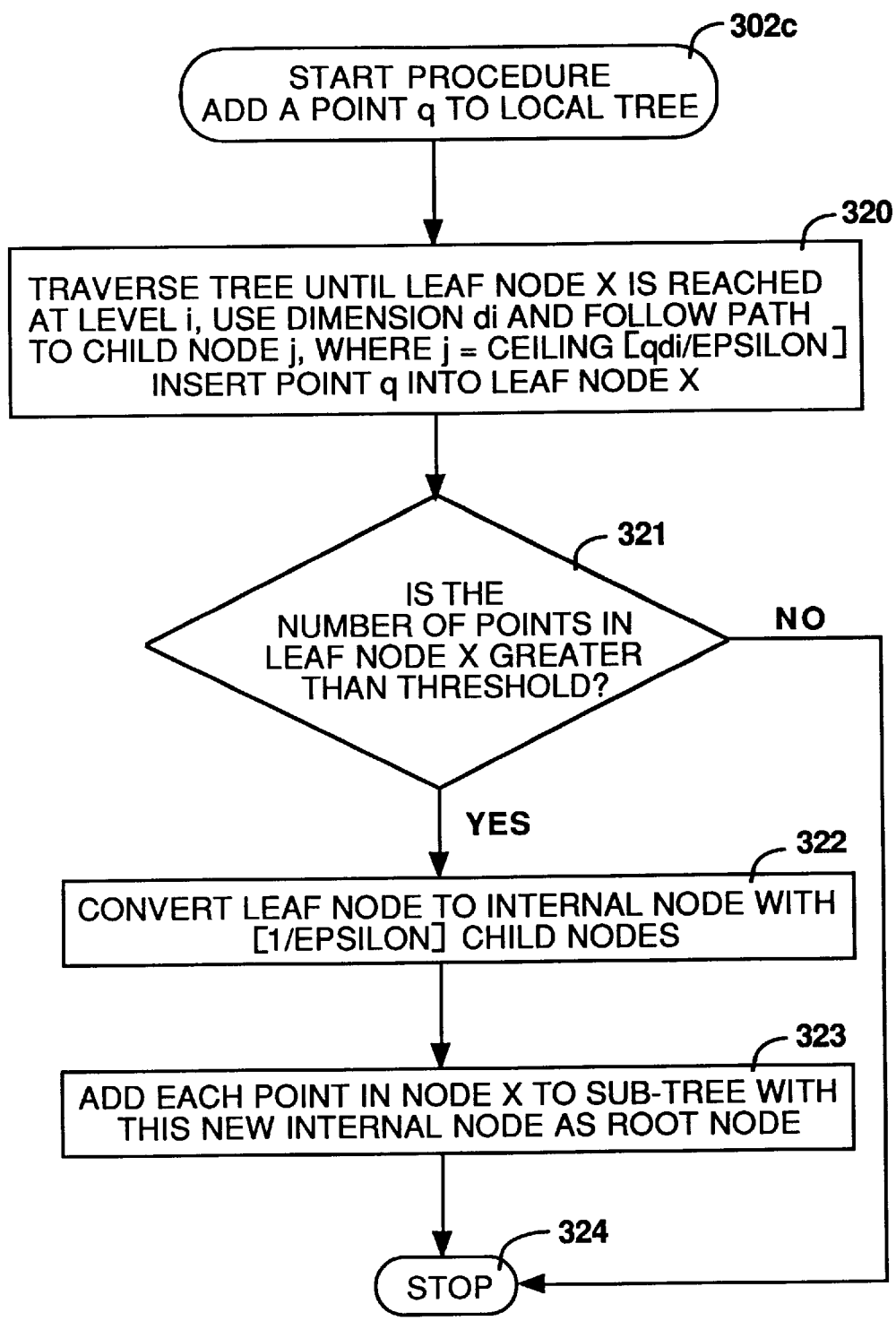
FIG. 12 is a diagrammatic flow-chart showing an embodiment of an Add Point to Local Tree Procedure within the Local Tree Build Procedure of FIG. 11.

The Local Tree Build Procedure (Step 302) is now described relative to the exemplary diagramatic flow-chart diagram in FIG. 11. First, an empty leaf node is initialized as a root node (Step 302b), then a first or next point q is added to the local tree (Step 302c) until all points have been added (Step 302d), at which time the Local Tree Build or construction procedure ends (Step 302). The Procedure for adding a point q to the local tree described briefly relative to FIG. 11 is now described in greater detail relative to FIG. 12. First, the local tree is traversed until leaf node x is reach ed. At level i, we use dimension d and follow a path to child node j. If the ceiling$[q_{di}/\epsilon]=j$, then the point q is inserted into leaf node x (Step 320). We then compare the number of points in the leaf node x with a threshold point count (Step 321), and if it is greater than that predetermined or preset threshold, we convert the leaf node x int o an internal node with ceiling$[1/\epsilon]$ child nodes (Step 322) and add each point in node x to a subtre(with this new internal node as its root node (Step 324). Otherwise, we end the procedure (Step 324).

Figure 13:
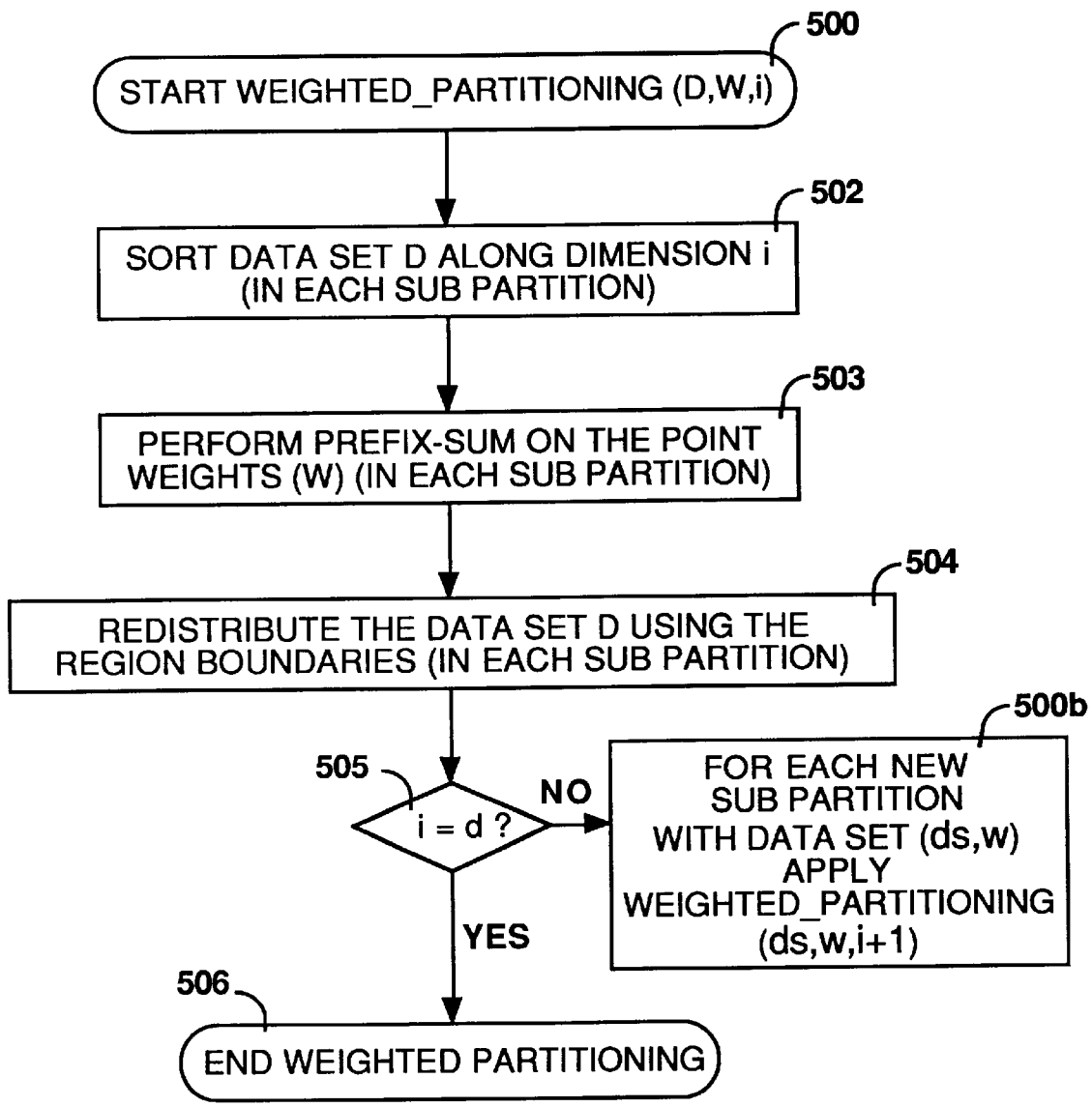
FIG. 13 is a diagrammatic flow-chart showing an embodiment of the Weight Application Procedure within the PW Procedure of FIG. 10.

The weight application portion or subprocedure within the iterative PW Partitioning Procedure, PW(D,W,i), is diagraenlatically illustrated in the flow chart of FIG. 13 (Step 500). First, the data set D is sorted along dimension i in parallel for each subpartition (Step 502). Then, a prefix-sum procedure (described elsewhere) is performed on the point weights (W) in parallel for each subpartition (Step 503). The data set D is then redistributed among the plurality of processors using the region boundaries in parallel for each subpartition. Each of the sort, prefix-sum computation, and redistribution steps (Steps 502, 503, and 504) are performed for each dimension i until a comparison indicates that they have been completed for each dimension less than or equal to tree depth d (Step 505), at which time the weighted partitioning ends. Otherwise the dimension i is incremented (i=i+1) and the weighed partitioning procedure is performed for each new subpartition (e.g. PW(ds,w,i+1)) (Step 500b).

A high-level description of the PW procedure (Step 300) is presented in the pseudo code representation immediately below:

*function* Partitioning1 (Step 300)
    Draw a random sample of size *s* from all the processors
    Run the PQ procedure on the sample points
    Assign weights to the sample points
    *for i* = 1 to D do
        for each partition *do in parallel*
            Sort the sample points along dimension *i*
            Perform prefix-sum on the point weights
            Find the region boundaries
            Redistribute the sample points
    Redistribute the entire data set using the region boundaries In this enhancement to the basic partitioning model, we only compute the number of join tests for each point, and do not generate any join output during this process. The number of join tests that would need to be performed is used to determine the weight w of each point in the sample tree. The weight of a point q, should be proportional to the work required in the region around that point. Under the PW procedure, this weighting information is used to guide the partitioning and redistribution of the entire data set. A global tree is built using only the sample points and weights associated with the sample points, rather than on the entire data set. The second stage of this procedure redistributes the full set of points among the processors using the region tree.

The first stage of the PW procedure is now described in greater detail. Recall that in the PQ procedure, the points were implicitly assigned equal weights. By comparison, the PW procedure assigns weights to points based on two factors: (1) the estimated number of required join tests for each point, and (2) the cost of traversing the tree for each point. Formally, the PW procedure uses the following function to assign weights to points:

$$W=f(pt)=rd+k3^{Depth} \qquad (6)$$

where W is the point weight, d is the dimensionality of the data points, k is a positive constant empirically defined relating to the relative computational efficiency of the rD computation (a type of join cost) and the $k3^{Depth}$ computation (a type of traversal cost) which is machine or hardware dependent, r is the estimated number of join tests for sample point pt, and Depth is the estimated depth of the ∈-k-d-B tree under the assumption that the data set has uniform distribution. The numerical value "3" in the above expression corresponds to the property of ∈-k-d-B tree that each node may join with a maximum of itself and the two neighboring nodes. We determine k empirically based on machine-to-machine variation in the comparison operations versus floating point operations. Typically k is in the range of from about 1 to about 3, more typically between about 1 and about 2, and the weights determined are not a sensitive function of k within this range. The value for k is related to the relative cost of traversal versus cost of distance computation. Note that $3^{Depth}$ is the maximum number of visited nodes during the course of the join procedure.

The PW partitioning procedure is generally similar to the PQ partitioning procedure except that in PW, the weights of the points are taken into account in finding the region boundaries. In each iteration of the multi-iteration PW partitioning process, we perform a two-step computation for each region which includes sorting the sample points globally and then computing prefix-sum on the point weights and a related computation of the total sum of the weights, W.

With respect to the global sorting for the sample points where part of the data resides in each processor and which sort involves use of all of the processors, there are many parallel sorting procedures in the literature which may be used in conjunction with the inventive structure and method. A sample sort as described in Ref. [3, 15] may be used because a sample sort of this type has been shown to be quite efficient [3, 15], but other parallel sorting procedures may alternatively be used. Next, a prefix-sum on the point weights is performed. The prefix-sum can be efficiently computed in three steps. In the first step, each processor i separately computes the sum of its local points, $w_i^{sum}$. The second step performs a global prefix-sum operation on the $w_i^{sum}$ values. This operation is very cheap since the size of the input is one [13]. In the third step, each processor i computes the prefix sum of its local points independently. Also, during the process of computing the prefix sums, we may compute the total sum of the weights, W.

Each of the points q in the dataset has a value q[v], a weight q[w] and a prefix-sum q[pref]. We would like to find z-1 points, $b_1, b_2, \ldots, b_{z-1}$, which represent the region boundaries such that: (1) $b_i < b_{i+1} \forall 0 < i < z-1$; and (2) the sum of the weights of each region is approximately W/z.

Using the above described PW partitioning procedure of generating the regions and associated region boundaries, it is guaranteed that the sum of weights associated with each region $R_i^{sum}$ is less than or equal to W/z+α, where α is the largest weight of the points, or in mathematical terms, $R_i^{sum} \leq w/z+$ for each region. This is the amount of load imbalance in one dimension, and is significant because it affects the load balance achieved for overall computation.

Each processor independently determines or identifies a subset of region boundaries, $b_i$'s, where each $b_i$ is the point $q_j$ in the sorted list where two conditions are satisfied, namely:

$$\left\lfloor \frac{q_j[pref]}{\frac{W}{z}} \right\rfloor \neq \left\lfloor \frac{q_j[pref] + q_j[w]}{\frac{W}{z}} \right\rfloor; \quad 1.$$

and $$i = \left\lfloor \frac{q_j[pref]}{\frac{W}{z}} \right\rfloor \quad 2.$$

The notation "$\lfloor g \rfloor$" in these equations means take the "floor of g, where the "floor" is the nearest integer less than g. For example, $\lfloor 5.5 \rfloor = 5$. Recall also that the notation "$\lceil g \rceil$" means the "ceiling of g", where the ceiling of g is the nearest larger integer. For example, $\lceil 5.5 \rceil = 6$.

Each processor needs the region boundaries, $b_i'$ of the other processors, in order to partition its local sample points among the processors. Thus, an All-Processor-to-All-Processor broadcast operation over the interconnected network of processors, where each particular processor broadcasts the same message to all other processors identifying its boundary region or boundary point information or data to all other processors either explicitly or implicitly requests the boundary region or boundary point information or data form each of the other processors, as described in [13]. Not every processor receiving the other processor's information will actually require or use it, but this is an efficient way to communicate it. Note that although each processor broadcasts the same type of boundary information, the content of such message will change from processor to processor. Note that an approximate quantiling procedure such as OPAQ (which used a sampled set to define quantiling parameters) as described earlier and in Reference [4] can be used, however, because of the efficiencies gained in the PQEST and PW procedures, a more accurate and/or precise quantiling procedure not utilizing such OPAQ approximations may be applied with a potential of even greater load equalization. Many quantiling procedures other than OPAQ are known and may be used and are not described further. After partitioning the space into p regions with the PW procedure, the entire data set is redistributed among the processors using the region boundaries.

The size of the PW sample data set affects the accuracy of load balance as well as the partitioning procedure overhead; a larger sample data set generally resulting in greater accuracy in the load balance. Generally, the cost of partitioning using the PW procedure is higher than the cost of partitioning with the PW procedure if all other factors are equal. However, the PW procedure will typically outperform the PQ procedure in the presence of moderate to significant data skew because any data skew present is, in principle, somewhat accounted for by the point weighting. In an alternative enhancement to the basic model, additional functionality is provided in the form of a hybrid procedure which selectively triggers one of the two procedures (PQ or PW) based on the degree of the data skew. Such selection may be valuable in spite of the potential computational expense associated with estimating the skew.

Local Tree Build Procedure (Step 120)

In this Local Tree Phase Procedure (See Step 120) which is conventional and is described elsewhere in the disclosure, each processor builds an ∈-k-d-B tree using only the local data points. The local tree build is applied locally to the points distributed to each processor during point redistribution. The tree build procedure is the same for any of the PQ, PQEST, or PW redistributed datasets, although the points themselves that build the trees will generally depend on which procedure was used.

Intersecting Regions Procedure (Step 130)

Figure 14:
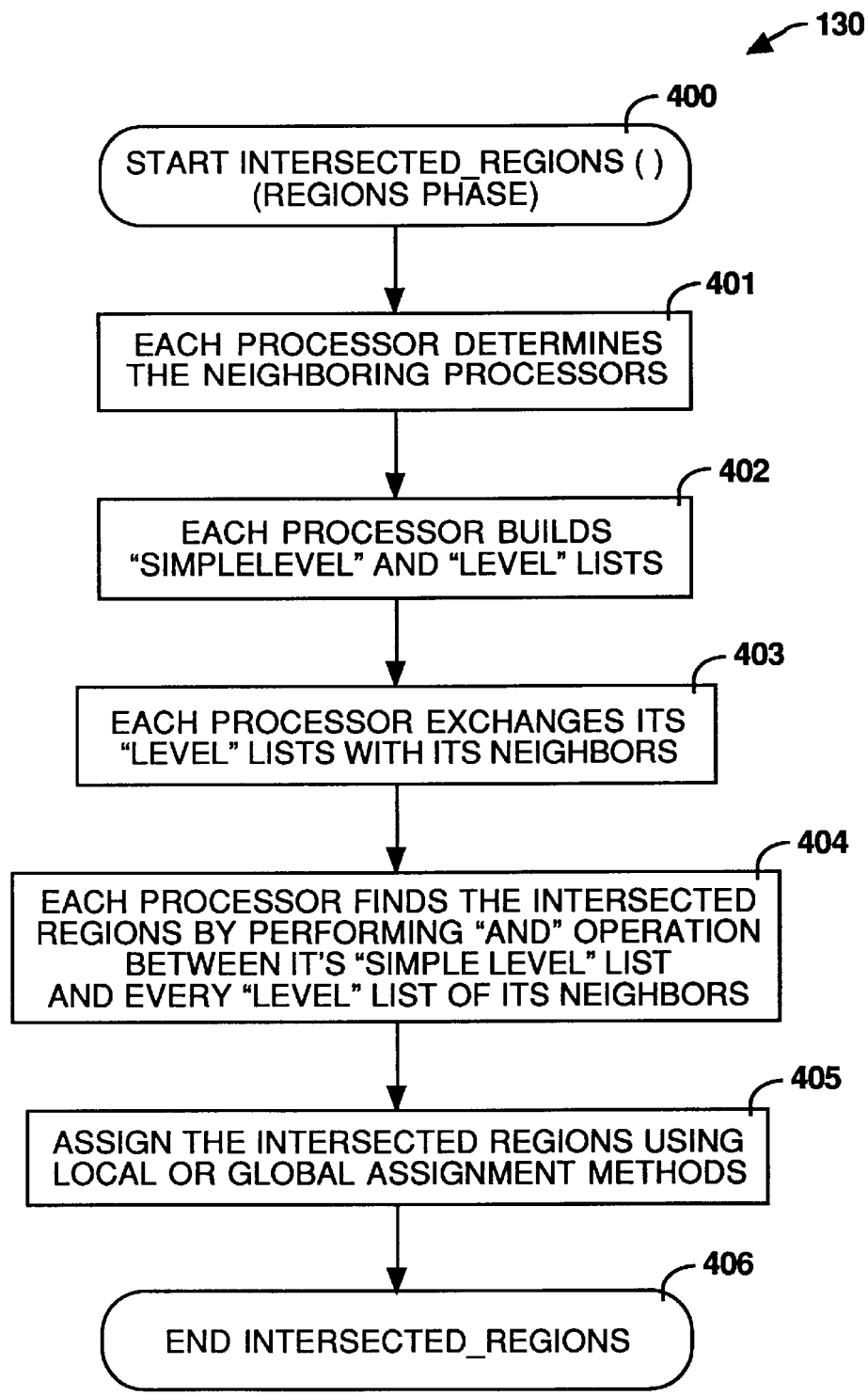
FIG. 14 is a diagrammatic flow-chart illustration of the Intersected Regions Phase of the Join Procedure.
Figure 15:
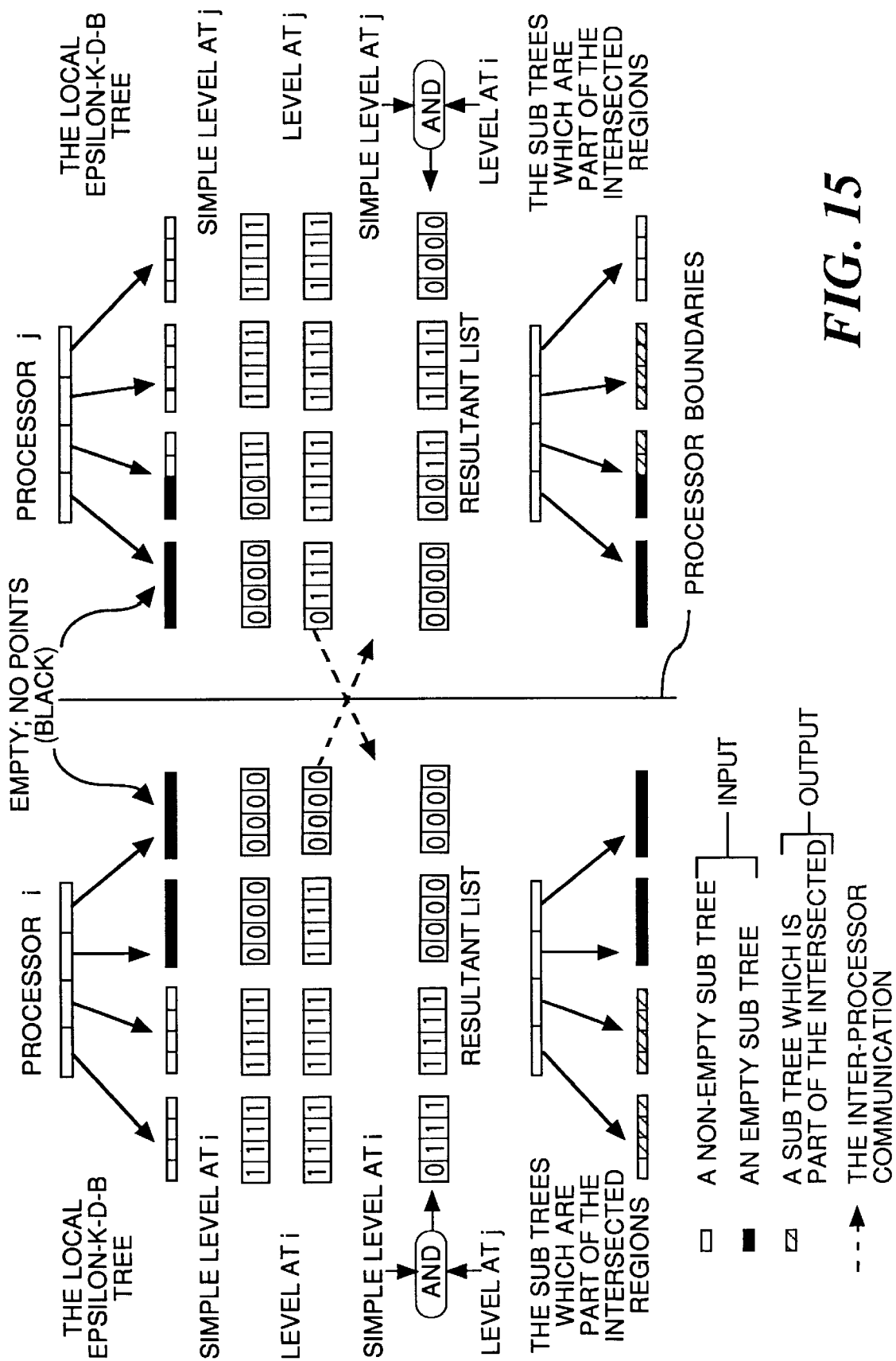
FIG. 15 is a diagrammatic illustration, showing the manner in which intersected regions between local ∈-k-d-B trees for two processors are identified using list data structures.

The Regions Phase (Step 130) is illustrated in the diagrammatic flow chart of FIG. 14. Each processor requires non-local data (e.g. data from other processors) to perform the similarity join, and in this phase, each processor determines which particular other processor(s) it needs to exchange this information by the following procedure (Step 401). Let $Inter_i$ represent the set of processors with which processor $p_i$ needs to communicate, where the term "Inter" is selected to represent the intersections set. Each processor $p_i$ uses the global part of the tree to determine the $Inter_i$ set. A join procedure, such as join procedure using Range-Query, or any other join procedure is carried out on the global tree to determine or identify all of the other processors that may have intersected region with processor $p_i$. A range query procedure generally gives all points between two range limits, and may be performed on one or more dimensional space. Many implementations of range-query are known and this not described further.

Furthermore, let processor j belong to the $Inter_i$ set. Processors $p_i$ and $p_j$ need to determine the intersected regions between them so that the join output contributed by the intersected region can be generated. Each processor makes this determination by first determining the neighboring processor using the global part of the tree (Step 401). After determining the intersected regions, processors $p_i$ and $p_j$ send to each other some of the points which belong to the intersected regions. There are several approaches for finding the intersected region between a pair of processors. Three examples are described here.

A simple and somewhat naive approach for finding the intersected region between processors $p_i$ and $p_j$ works as follows. Both processors $p_i$ and $p_j$ first sort their local points along some common dimension R. Let $max_i$ and $min_i$ be the maximum and minimum values in processor $p_i$'s sorted list along dimension R, and $max_j$ and $min_j$ be defined similarly for processor $p_j$. Since we are looking for the points within $\epsilon$ distance of each other, the regions of the two processors are extended by $\epsilon$ along each direction. The extended region of processor $p_i$ is defined by $max_{i\epsilon}=max_i+\epsilon$ and $min_{i\epsilon}=min_i-\epsilon$. The extended region of processor $p_j$ is defined similarly that is $max_{j\epsilon}=max_j+\epsilon$ and $min_{j\epsilon}=min_j-\epsilon$. The intersected region between processors $p_i$ and $p_j$ are determined using the boundary points ($max_{i\epsilon}$, $min_{i\epsilon}$, $max_{j\epsilon}$, and $min_{j\epsilon}$), and each processor can determine the points which are needed by the other processor using the other processor's extended region. Somewhat undesirably, this first approach may result in exchanging more points between processors than is needed, thereby increasing the interprocessor communication requirement.

The number of points exchanged may be reduced by applying an alternative and more sophisticated approach where each processor builds "SimpleLevel" and "Level" lists (Step 402) defined below. In this approach, the local $\epsilon$-k-d-B trees of each of the plurality of processors are used to identify the intersected regions. One parameter of this second approach, is a level number l that corresponds to a level of the local $\epsilon$-k-d-B tree. For this level l, each processor $p_i$ (or $p_j$) generates first and second lists represented respectively by $SimpleLevel^l_i$ (or $SimpleLevel^l_j$) and $Level^l_i$ (or $Level^l_j$). These two lists represent the lth level of the local tree of processor $p_i$ (or $p_j$). An entry r in the $SimpleLevel^l_i$ list represents the $r^{th}$ sub-tree R. The entry is essentially a binary flag, taking on the value of either zero ("0") or one ("1") depending on whether the sub-tree at that level is empty ("0") or not empty ("1"). Of course, the opposite logic could be used, and other indicators having the same function could be substituted.

An entry r of the $Level^l_i$ list represents the $r^{th}$ sub-tree R and all the "join-able" sub-trees which need to be joined with R at the $l^{th}$ level of the tree in order to produce the join output. A value of "1" is assigned to this $Level^l_i$ list entry if either sub-tree R, or any of its joinable sub-trees are non-empty. Otherwise, a value of "0" is assigned. Note the sizes of the $SimpleLevel^l_i$ and $Level^l_i$ lists are $(1/\epsilon)^l$ which is also equal to the tree branch factor raised to the exponent l ($b^l$).

The value of the level (l) parameter, which is used in building these lists, affects the performance of the overall procedure. Typically, a large value of l increases the cost of building and sending/receiving the lists. On the other hand, a large value of l may decrease the number of points which are part of the intersected region. So that there is some tradeoff in selecting an appropriate level parameter.

As a third and alternative, instead of using a fixed value of l, we can determine the value of l dynamically as follows. Start with some small value of l (that is change the level), say by 1 or 2, and determine the intersected region assuming the initial small l. If the number of points belonging to the intersected region is high, then increase the value of l by some predetermined value (for example, increase by 1 or 2) and repeat the process until the value of l has reached some user defined maximum value, or the number of points exchanged among processors is small. It is not always easy to determine the optimal or near-optimal value of l and such value is typically determined empirically based on system parameters, typically l is a value in the range between about 1 to about 5, more typically within the range from 1–3, and even more typically within the range from about 1 to 2.

Once a suitable level l parameter has been determined and the lists generated, processors $p_i$ and $p_j$ exchange their Level lists (Step 403). From the characteristics of the $\epsilon$-k-d-B tree, we know that for any interior node x, the points in a child y of node x will be at distance more than $\epsilon$ from any points in any of the other children y of node x, except for the two children adjacent to y as described in Reference [2]. Thus, the points of the subtree r of processor $p_i$ (or processor $p_j$) are part of the intersected region with processor $p_j$ (or $p_i$) if $SimpleLevel^l_i[r]=1$ (or $SimpleLevel^l_j[r]=1$) and $Level^l_j[r]=1$ (or $Level^l_i[r]=1$).

Each processor finds the intersected regions by performing a boolean or logical "AND" operation between its own "SimpleLevel" list and every "Level" list of its neighbors (Step 404). Finally, the intersected regions are assigned using either a local or a global assignment scheme as described in greater detail below (Step 405). Furthermore, after determining the intersected regions, we can optimally use one of the approaches described earlier to minimize the number of points in each region.

FIG. 14 is a diagrammatic illustration, showing the manner in which intersected regions between local $\epsilon$-k-d-B trees for processor $p_i$ and processor $p_j$ are identified in the regions phase of the procedure. Three types of subtree regions are shown: (a) non-empty subtrees which have some points; (b) empty subtrees which do not have any points; and (c) subtrees which are partially intersected, that is they are part of the intersected region. These different types of subtree regions are indicated by alternative shadings as indicated in the figure.

For each processor, a simple level list is constructed as described above. For processor $p_i$, the simple list has the binary values "1111 1111 0000 0000" and the level list has binary values "1111 111 1111 0000". For processor $p_j$, the simple list has the binary values "0000 0011 1111 1111" and the level list has binary values "0111 1111 1111 1111". The simple-level list of processor $p_i$ is logically "ANDed" with the level list of processor $p_j$ on a bit-by-bit basis and results in the resultant list "0111 1111 0000 0000". Analogously, the SimpleLevel list of processor $p_j$ is ANDed with the Level list of processor $p_i$, on a bit-by-bit basis to result in a result list for processor $p_j$ having the values "000 0011 1111 0000". Subregions where the resultant list is "1" represent a subtree which is part of the intersected regions and participate in interprocessor communication. Subregions that have "0" in the resultant list data structure do not participate in the interprocessor communication.

For potential result points (a,b) such that a and b belong to the same processor (e.g. both belonging to $p_i$ or both belonging to $p_j$), we assume that the computation is performed by the processor which contains these two points. However, the situation is different for potential result points (a,b) such that a and b belong to different processors $p_i$ and $p_j$ respectively. The computation can be performed on processor $p_i$ or $p_j$. It is also possible to perform this computation on a processor different than $p_i$ and $p_j$; however, performing the computation on a different processor may typically be disadvantageous as it may generally result in extra interprocessor communication without significantly improving the load balance.

For skewed data sets, an inappropriate assignment of computation for such points can result in substantial load imbalance even assuming that the computations that require only local data points are well balanced. Processors $p_i$ and $p_j$ desirably exchange some of the points of the intersected regions such that a good load-balance is achieved. This problem is an optimization problem where there are p processors. Each of the processors has an intersected region with the other processors. Let $n_{ij}$ be the number of points which are local to processor $p_i$ and belong to the intersected regions between processors $p_i$ and $p_j$. It is advantageous to assign some of the $n_{ij}$ points to processor $p_j$, and some of the $n_{ji}$ points to processor $p_i$.

To this end, local and global assignment strategies for assignment of these computations have been developed (Step 405). These two types of assignment strategies differ primarily in whether they use global information or local information. The strategy based on global information ($n_{ij} \forall 1 \leq i,j \leq P$ and $i \neq j$, where P is the total number of processors) uses information about all the processors for performing this assignment. The strategy based on local information uses only information gathered by processor $p_i$ from its Inter $_i$ list of processors (i.e., it only uses $n_{ij}$ and $n_{ji}$). The global assignment strategy is typically expected to result in a better load balance among processors; however, this may not be preferable due to potentially higher cost and potentially poor scalability as its complexity is proportional to $p^2$. Either the global or local assignment strategy may be used and exemplary embodiments are described in the following section. The process of determining intersected regions then ends (Step 406).

In one particular exemplary global procedure, each processor has a copy of all the global information which can be represented by a matrix of size P×P (RegionMatrix). An entry RegionMatrix[i,j] where as before $1 \leq i,j \leq P$ and $i \neq j$ specifies the number of points which are local to processor $p_i$ and belong to the intersected regions between processors $p_i$ and $p_j$ The procedure makes a series of decisions iteratively. First, the total sum (TotalSum) of each column of RegionMatrix is computed. TotalSum$_i$ is the $i^{th}$ entry of the TotalSum RegionMatrix and represents the total number of points that can potentially be received at processor $p_i$ from other processors with which there are intersected regions. Initially, the procedure initializes or unmarks all the processors and performs the following steps at most p-1 times where p is the number of processors: (1) Find the smallest entry in TotalSum$_i$ among the unmarked processors, for example for processor $p_j$ (Step 421); (2) Mark processor $p_j$ as a receiver for all the current entries in RegionMatrix [*,j], where "*" represents all possible values (Step 422); (3) Set RegionMatrix [j,*] to zero if RegionMatrix [*,j] is not zero (Step 423); and (4) Update RegionMatrix and TotalSum $_i$ (Step 424).

Alternatively, in an exemplary local assignment method, processors $p_i$ and $p_j$ divide the work of their intersected region into two halves such that each processor will perform half of the work. Assume that the local regions of processors $p_i$ and $p_j$ are U and V. Let region V be divided into approximately two equal halves, $V_1$ and $V_2$, such that processor $p_i$ will perform the similarity join for U and $V_1$ and processor $p_j$ will perform the join for U and $V_2$ (Step 431). By approximately we mean that each region U and V is divided into portions such that each region has the number of points in each region is the same, plus or minus one or a few counts, taking into account that the number of points before partition may be an odd number.

Similarity Join Procedure (Step 140)

The Join Phase

The similarity join (Step 103) is performed on the local tree using self-join procedure, and the join between the local and the intersected region trees using the non-self-join procedure, in order to complete the parallel-similarity join method diagrammatically illustrated in the flow-chart of FIG. 4. We use the procedure which has been described earlier to perform the self-join and non-self-join. In performing the non-self-join, we desirably ensure that we do not generate duplicates in the join output, by employing the regions phase (phase 3) assignment procedures described previously.

In performing the join on the local points, employing the unused dimensions in the top levels of the local tree will typically outperform using the dimensions which have already been used for building the global part of the tree. Whereas, in performing the join between the local points and the non-local points the opposite is true. Thus, building two local trees (one for performing the local join and the other one for non-local join) may yield some improvement over the performance obtained with a single tree, assuming that the cost of building the tree is small compared to the cost of the join procedure. However, the benefits realized with either approach may generally depend on the characteristics of the particular data set.

There are two types of similarity join: (1) a similarity self-join is a similarity join performed on one set of points $T_1$; and (2) a similarity non-self-join is a similarity join performed on two sets $T_1$ and $T_2$ of points to find all pairs (x,y) of points that are within $\epsilon$ distance, where x$\epsilon T_1$ and y $\epsilon T_2$. Mathematically speaking, we define self-join and non-self-join as follows: (1) Self-join: T→Φ where T is an $\epsilon$-k-d-B tree and Φ is a set of all pairs (x,y) of points that are within $\epsilon$ distance for some $L_p$-norm distance metric, where x≠y and x and y$\epsilon$T, and (2) Non-Self-join: $T_1 \times T_2 \rightarrow \Phi$ where $T_1$ and $T_2$ are $\epsilon$-k-d-B tree and Φ is a set of all pairs (x,y) of points that are within $\epsilon$ distance for some $L_p$-norm distance metric, where x$\epsilon T_1$ and y$\epsilon T_2$.

Figure 16:
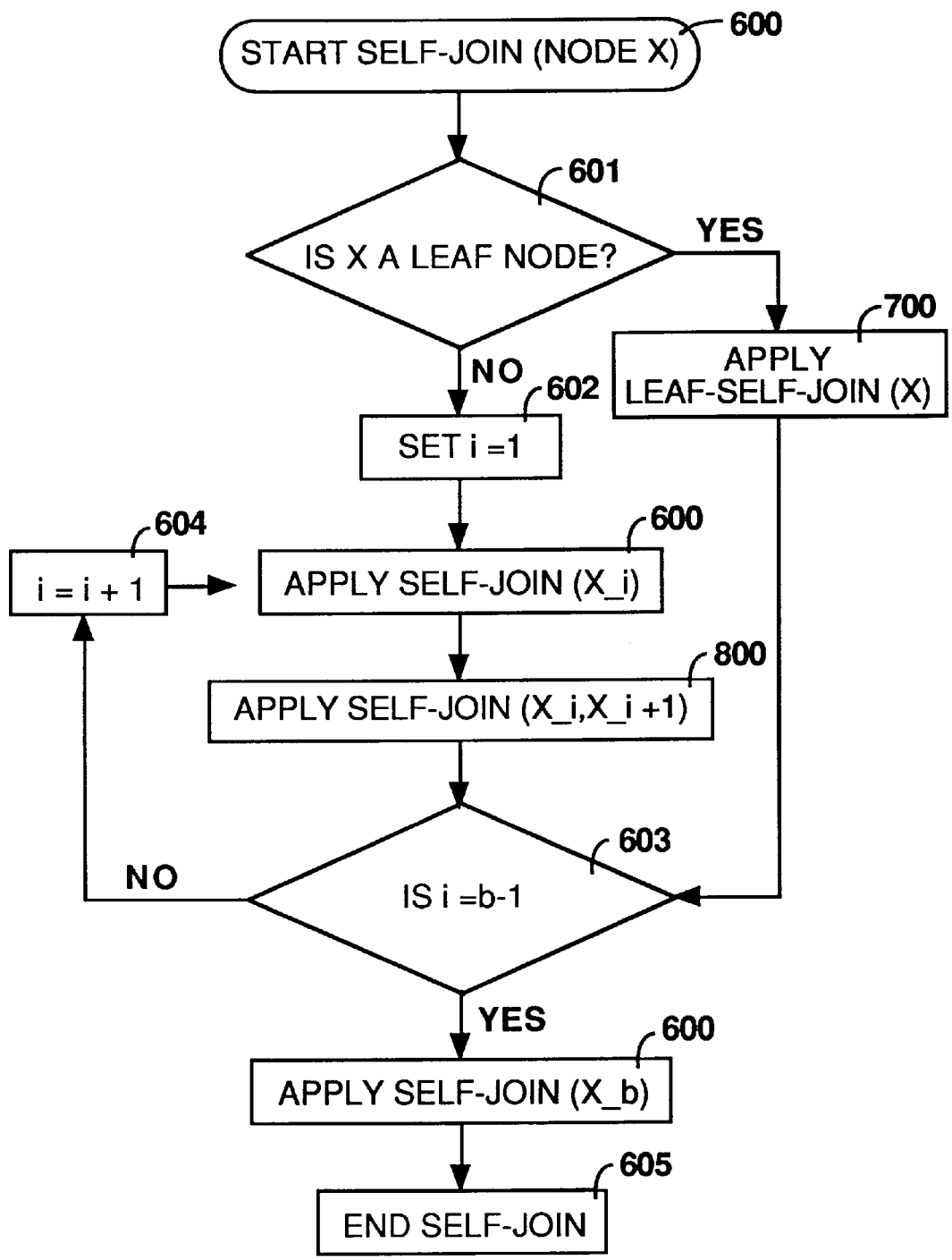
FIG. 16 is a diagrammatic flow-chart showing an embodiment of the sequential ∈-k-d-B tree self similarity join procedure.
Figure 17:
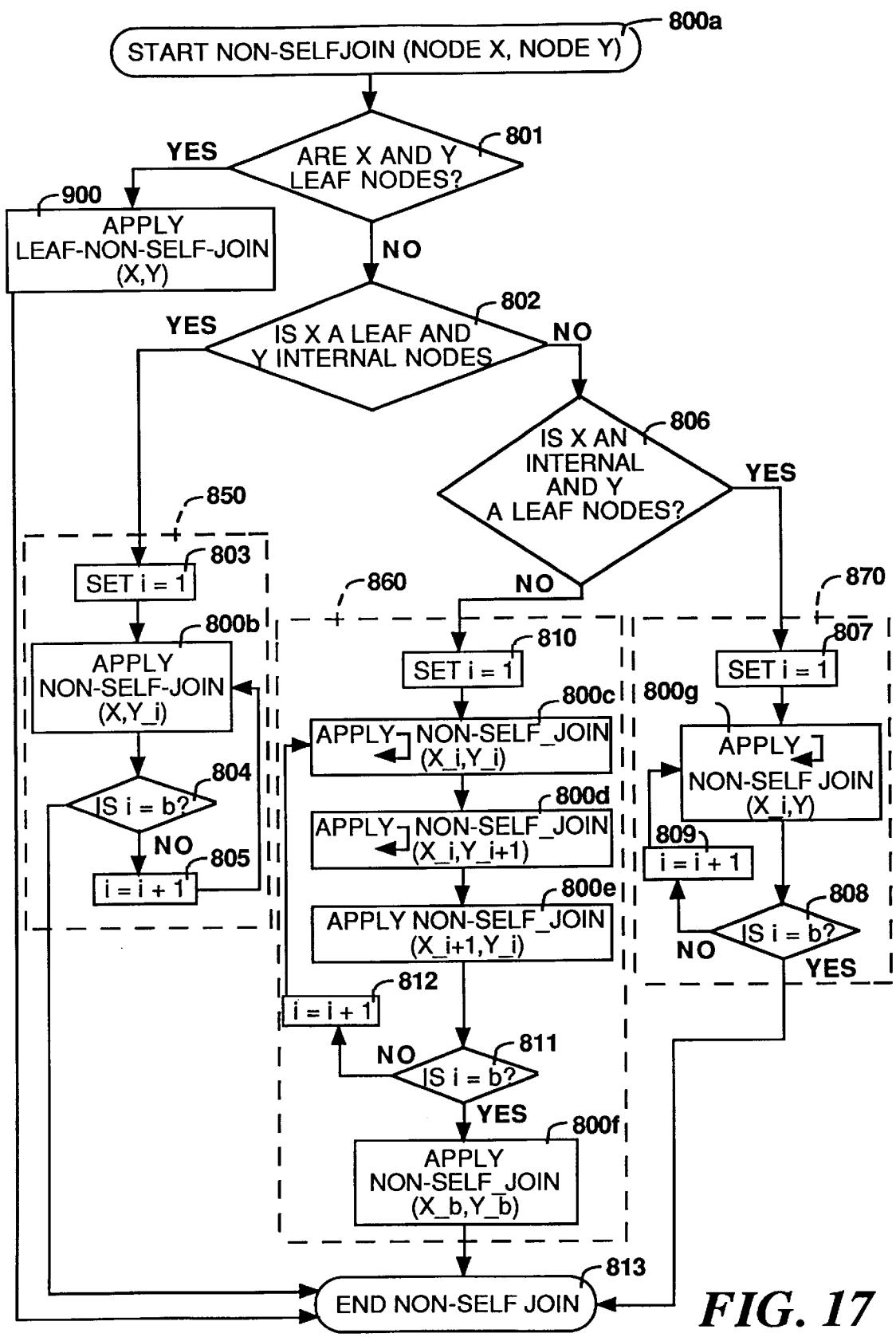
FIG. 17 is a diagrammatic flow-chart showing an embodiment of the sequential ∈-k-d-B tree non-self similarity join procedure.

FIG. 16 and FIG. 17 provide diagrammatic flow chart descriptions of the sequential $\epsilon$-k-d-B tree self similarity join (FIG. 16) and non-self similarity join (FIG. 17) procedures. In each of the figures, node $x_i$ is the $i^{th}$ child of node x (and node $y_i$ is the $i^{th}$ child of node y). The leaf-self-join and leaf-non-self-join procedures perform a sequential similarity join on one and two lists, respectively. These leaf-self-join and leaf-non-self-join procedures performed within each processor and may execute concurrently on each processor thereby operating in a parallel or pseudo-parallel manner.

Self-Join Subprocedure (Step 600)

With respect to the flow chart diagram in FIG. 16, wherein an exemplary embodiment of a selfjoin procedure is shown, the self-join is initiated for node x (Step 600), then a determination is made as to whether x is a leaf node (Step 601). If node x is a leaf node, then the leaf-self-join(x) procedure is performed (Step 700) and the Self-join for node x ends (Step 605). On the other hand, if node x is not a leaf node, then a counter i is set to 1 (i=1) (step 602) and the self-join is performed for node $x_i$ (or $x_i$) where i is an index identifying the particular child of node x and the notation $x_i$ refers to the $i^{th}$ child of x. Note here that the index i does not refer to the tree level. The relationship between node x and its children is diagrammatically illustrated for a section of a tree in FIG. 6. The result of the self-join of $x_i$ is used as an input to the non-self-join of the pair $(x_i, x_{i+1})$ where $x_{i+1}$ refers to $(i+1)^{th}$ child of x (Step 800). The steps of the non-self-join procedure are described more fully relative to the flow chart diagram in FIG. 17. A determination or comparison is made as to whether the i=b−1, where b is the branch factor and i is the child node index (Step 603). If i is equal to the branch factor b minus 1, that is i=b−1, where branch factor b=1/ϵ, then the self-join procedure is performed for the $b^{th}$ child of node x ($x_b$) (Step 600). Otherwise, if i is less than b−1, i is incremented by 1 (Step 604), and the self-join procedure is repeated for the new $x_i$ (Step 600). The procedure (Steps 600, 800, 603, 604) is iterated for different children i of node x until i is one less than the branch factor b.

A pseudo-code high-level description of the self-join function procedure for node x, branch factor b, and child i, is as follows:

*function* Self-join(node *x*)
/\*b is the branch factor (=1/ϵ) \*/
*if x* is a *leaf* node *then*
    leaf-self-join(x) /\* performs join among all points in leaf node \*/
    *return*
*for i* = 1 to *b* − 1 *do*
    Self-join($x_i$)
    Non-self-join($x_i$, $x_{i+1}$)
Self-join($x_b$)

Non-Self-Join Subprocedure (Step 800)

An embodiment of the non-self-join procedure (Step 800) for (node x, node y) is now described relative to the flow chart diagram in FIG. 17. The Non-Self-Join(node x, node y) procedure starts (Step 800) with a determination as to whether x and y are leaf nodes (Step 801). If both are leaf nodes, then the leaf-non-self-join(x,y) procedure is applied (Step 900) and the non-selfjoin procedure ends (Step 813). On the other hand, if node x is a leaf node and y is an internal node then (Step 850) the join of a leaf node and internal node is computed in the following manner. First, the child i is set equal to "1" (Step 803), then the non-self-join procedure is applied to nodes x and $y_1$ (Step 800*b*). At this point, if the child (i) is equal to the branch factor (b), then the non-self-join procedure ends (Step 813), otherwise the child identifier is incremented by one (i=i+1) (Step 805), and the non-self-join (x,$y_i$) procedure is repeated for the new i or, equivalently, for the next child (Step 800*b*). The procedure (Steps 800*b*, 804, 805) iterates until the non-self-join has been performred for each child up to the branch factor at which time the iteration ends and the non-self-join procedure ends (Step 813).

Where node x is not a leaf node or y is not an internal node (Step 802), a further determination is made as to whether x is an internal node and y is a leaf node (Step 806). When true, a non-selfjoin($x_i$,y) is performed iteratively (Step 870) beginning at level i=1 (Step 807), and continuing for all children i up to and including the branch level b (Steps 807, 800*g*, 808, 809). When the child equals the branch factor, the non-self-join procedure ends (Step 813).

The final case to be considered is that in which it is not true that x and y are leaf nodes (Step 801) and it is not true that x is a leaf node and y is an internal node (Step 802), and it is not true that x is an internal node and y is a leaf node (Step 806). In this case, the non-self-join is applied for different nodes as follows. The child counter is initialized at i=1 (Step 810), then the non-selfjoin($x_i$,$y_i$) is applied (Step 800*c*), followed by applying the non-self-join to $(x_{i+1}, y_1)$ (Step 800*d*), followed by applying the non-self-join procedure to $(x_{i+1}, y_i)$ in sequence. A comparison is made to determine if the current child (i) is equal to the branch factor minus one (step 811), and if it is not equal then the child is increased by one (Step 812) and the three non-self-join procedures are repeated for the new value of i (Steps 800*c*, 800*d*, 800*e*), until i=b−1 (Step 811), when the non-self-join procedure is applied (Step 800*f*) to $(x_b, y_b)$ and the non-self-join procedure ends (Step 813).

A pseudo-code high-level description of the non-self-join function procedure for node x, node y, branch factor b, at level i, is as follows:

*function* Non-self-join(node x, node y)
/\* b is the branch factor (=1/ϵ) \*/
if x and y are leaf nodes then
    leaf-non-self-join(x,y)
if x is a leaf node and y is an internal node then
    for i=1 to b do
        Non-self-join(x,$y_i$)
if x is an internal node and y is a leaf node then
    for i=1 to b do
        Non-self-join($x_i$, y)
if x and y are internal nodes then
    for i=1 to b − 1 do
        Non-self-join($x_i$, $y_i$)
        Non-self-join($x_i$, $y_{i+1}$)
        Non-self-join($x_{i+1}$, $y_i$)
    Non-self-join($x_b$, $y_b$)

Sort-Merge Subprocedure

In the inventive structure and method, we use a standard sort-merge procedure to carry out the similarity join on the list (for self-join) or lists (for non-self-join), including for the leaf-self-join and leaf-non-self-join procedures. These sort-merge procedures are well known in the art and not in detail here. The sort-merge procedure advantageously sorts the points along a common unused dimension. Therefore, this dimension should be reserved and remain unused in the process of constructing the tree. For high-dimensional points, it is likely that there will be unused dimensions. (For example, for ten-dimensional points and ϵ=0.1, there would have to be greater than $10^{10}$ points before all dimensions would be used.) After building the tree, the points are sorted along that (unused common) dimension in every leaf node. If all the points are already sorted in that dimension in a pre-processing step, they do not need to be sorted again after the tree is built. Other aspects of sequential ϵ-k-d-B tree and sequential similarity join are described in Reference [2] which is hereby incorporated by reference. Other standard sort-merge procedures are known in the art and may be used with the inventive method and are not described further.

Dynamic Leaf Size Determination Procedure

In general, the performance of the similarity join procedure using ε-k-d-B tree is strongly dependent on the leaf node size. The size of the leaf node affects the depth of the tree as well as the number of join tests (self-join or non-self-join) performed. A small leaf size will generally increase the depth of the tree which will generally result in a decrease in the number of join tests performed. On the other hand, a small leaf size might increase the cost associated with traversing the tree.

Therefore, the optimal (or near-optimal) value of the leaf size depends on several factors such as the total number of points, the dimensionality of the points, the value of ε, and the distribution of the dataset. Note that the theoretical optimum leaf size may be difficult to determine, and that in practice determination and use of such theoretical optimum is not required, rather a near-optimal leaf size may be used.

Broadly speaking, there are two approaches to determine the optimum (or near-optimal) leaf size: The leaf size may be determined "statically" or dynamically. For a Static determination, the leaf size is fixed and determined statically regardless of any available information about the problem instance. Alternatively, for a Dynamic determination, the leaf size is variable and determined by taking account of at least some of the available information about the problem instance. Conventional approaches for leaf size determination have heretofore been limited to static determination. An overall approach that uses dynamic determination is disclosed as well as particular embodiments of that approach.

As we will see, the dynamic approach may generally perform better than the static approach, particularly in cases where there is skew in the distribution of the dataset. Therefore, the inventive structure and method provide a work/cost model for optimizing the leaf size. A problematical derivation is provided for the assumption that the dataset is uniformly distributed; however, the inventive procedure is not limited to such uniformly distributed datasets. Even when the dataset distribution is not uniform, the inventive dynamic leaf size determination under the inventive cost model generally provides improvement over the static approach, even if the theoretical optimum leaf size for the non-uniformly distributed dataset is not identified.

The dynamic leaf size determination is now described. The work or cost (C) of performing the join procedure (self-join or non-self-join) can be modeled based on the parameters of the particular database problem instance as follows: Cost=C=traversal cost+join cost, where:

$$\text{traversal cost} = \frac{\text{number of leaf nodes}}{2} \times \text{number of visited nodes}$$

and $$\text{join cost} = \frac{\text{number of leaf nodes}}{2} \times k \times \text{number of visited nodes} \times$$

$$2 \in \times (\text{size of leaf node})^2 \times \text{number of dimensions}.$$

The manner in which the optimum, or at least the near-optimum or most appropriate leaf size, is determined from Cost (C) is now described. In the derivation immediately below, the following notation is used: b=the tree branch (fan-out) factor (b=1/ε); depth=the depth of the tree; n=the number of points in the data set; d=the dimensionality of the points. The constant k is a constant that typically depends on the machine, hardware, or structure on which the inventive cost procedure is implemented and relates to the relative efficiency or speed at which the particular structure is able to perform the transversal cost and the join cost subprocedures which each involve different types of operations. While k may not generally be defined in closed mathematical form, it may be derived empirically by selecting or defining the hardware (for example, the number and characteristics of processors, interconnect speed and bandwidth, memory, and the like) and separately performing the join operation and the traversed operation to determine a timing for each. The implementation constant k is then chosen to optimize the overall cost as the sum of the join cost and traversal cost.

At a top-level, one embodiment of the method for determining optimal leaf size comprises a two step procedure: (a) determining the tree traversal cost, (b) determining the join cost, and in some cases making an implementation (hardware) specific weighting of these costs (factor "k") to determine optimal leaf size for the dataset and hardware.

Under our working assumption that the dataset is uniformly distributed (recall that there is no requirement that the database to be joined is actually uniform), the number of leaf nodes is approximately equal to the branch factor raised to the depth of the tree (number of leaf nodes≈$b^{depth}$), and the size of the leaf nodes is approximately equal to the number of points divided by the previous number of leaf nodes (size of leaf nodes≈$n/b^{depth}$). Those workers having ordinary skill in the art in light of the present disclosure will appreciate the manner in which the exemplary cost model embodiment can be extended using assumptions other than the uniform distribution assumption that the number of leaf nodes≈$b^{depth}$ and that size of leaf node≈$n/b^{depth}$, which are appropriate to other data set distributions.

The upper bound on the number of visited nodes per leaf node is equal to the number of nodes with which another node may be joined (including joined with itself) raised to the power of the depth of the tree, or $3^{depth}$ (since any particular node can only be joined with itself and its two adjacent sibling nodes). Thus, substituting into the earlier expression for join cost, traversal cost, and overall Cost (C), and taking into account the result that the approximate number of leaf node≈$b^{depth}$, size of leaf node≈$n/b^{depth}$, ε=1/b, and upper bound number of visited nodes=$3^{depth}$, we obtain the resultant Cost (C):

$$C \simeq \frac{b^{depth}}{2}\left[3^{depth-} + \left[k \times 3^{depth} \times 2 \times \frac{1}{b} \times \left(\frac{n}{b^{depth}}\right)^2 \times d\right]\right]$$

To find the optimal value of depth, we need to differentiate Cost (C) with respect to the depth of the tree (depth).

$$\frac{\partial C}{\partial \text{depth}} = \frac{1}{2}(3b)^{depth}\ln(3b) + k\frac{1}{b}\left(\frac{3}{b}\right)^{depth}\ln\frac{3}{b}n^2 d$$

By equating this $$\frac{\partial C}{\partial \text{depth}}$$

result to zero (whch corresponds to the condition that Cost is a local minimum relative to the tree depth) and solving it for depth, we get:

$$\text{depth} = \frac{1}{2}\log_b \frac{k}{2} + \log_b\left(-\frac{\ln(3/b)}{\ln 3b}\right) + \log_b n + \frac{1}{2}\log_b d - 0.5. \quad (4)$$

Thus, the depth of the tree (depth) under these conditions is $$\text{depth} \simeq \frac{1}{2}\log_b\left(-\frac{\ln(3/b)}{\ln 3b}\right) + \log_b n + \frac{1}{2}\log_b d - 0.5 \quad (5)$$

An appropriate value of leaf size (LS) is given by the expression:

$$LS \in \left[\frac{n}{b^{depth}}, \frac{n}{b^{depth-1}} + 1\right],$$

where depth is given by equation (5), or in another words, the optimum leaf size is in the range from $n/b^{depth}$ to $n/b^{(depth-1)}+1$.

Several sets of validation tests were conducted on datasets having uniform and gaussian distributions (with different standard deviations) for different values of $\epsilon$, different data sizes (n), and different leaf sizes (LS) to validate the above expression for leaf size. The range of the data points for the data sets was set to [0,2]. The $L_2$-norm metric (detailed above) was used as the distance metric for evaluating the inventive cost model. For example, in different experiments we alternatively set leaf size (LS) to the maximum value ($n/b^{depth-1}+1$), the minimum value ($n/b^{depth}$), and to the arithmetic or geometric averages of the maximum and minimum. The arithmetic average, denoted AA, gives the best performance in many cases, where the Arithmetic Average is given by the expression:

$$\text{Arithmetic Average} = \left[\frac{bn + n}{2b^{depth}} + 0.5\right].$$

Generally, validation results indicated that the inventive cost model using a dynamically determined leaf size is effective and overall is better than using some fixed d leaf size. The inventive cost model for performing similarity join using the $\epsilon$-k-d-B tree which may be applied to either a sequential similarity join or parallel similarity join implementations described. This cost model is advantageously used to estimate the leaf size threshold. Validation tests on data sets with uniform and Gaussian distributions to show that the cost model which uses dynamic variable leaf size determination is significantly more effective than models selecting some constant leaf size thresholds. Cost models used heretodfor known by the inventors have used only the join cost and have not taken into account both the join and traversal components of the overall cost.

All publications and patent applications mentioned in this specification are herein incorporated by reference to the same extent as if each individual publication or patent application was specifically and individually indicated to be incorporated by reference.

The fore going description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The present invention is not constrained to the computer systems shown in FIGS. 1 and 2. One skilled in the art, in light of the disclosure provided herewith, can easily modify the invention to other computing and processing element architectures, processors, interconnection networks, integrated circuit designs, other types of electronic devices, and the like.

Further, the method and system described hereinabove is amenable for execution on various types of executable mediums other than a memory device such as a random access memory. Other types of executable mediums can be used, such as but not limited to, a computer readable storage medium which can be any memory device, compact disk, magnetic disc, hard disk, or floppy disk.

The invention now being fully described, it will be apparent to one of ordinary skill in the art that many changes and modifications can be made thereto without departing from the spirit or scope of the appended claims.

We claim:

1. In a computing system having a plurality of interconnected processing elements and a memory storing an object set comprising a plurality of objects, a method of joining ones of said objects based on predetermined similarity criteria, the steps of the method comprising:

storing in said memory, references to said plurality of objects in said object set;

partitioning said object set into a plurality of subpartitions to associate ones of said plurality of objects among said plurality of processing elements;

within each particular processing element, constructing an object tree structure organizing said ones of said plurality of objects associated with said particular processing element;

within each particular processing element, determining intersecting regions with neighboring processing elements for each said particular processing element based on predetermined first rules;

exchanging objects between each said particular processing element and said neighboring processing elements based on predetermined second rules; and joining said objects based on a predetermined object similarity criteria to generate joined groups of multi-dimensional objects.

2. The method in claim 1, wherein said object set comprises a data set and at least ones of said objects comprise multi-dimensional data objects.

3. The method in claim 1, wherein said object set comprises a multi-dimensional data set and said objects comprise multi-dimensional data points within said data set.

4. The method in claim 1, further comprising the steps of:

prior to said step of partitioning said objects, sensing a physical system and generating a data object representative of said sensed physical system, and receiving a data object from a source separate from said processing elements or said memory associated with said processing elements; and after said step of exchanging objects between each said particular processing element and said neighboring processing elements, generating a set of multi-dimensional object join sets, and generating a decision metric based on said object join sets.

5. The method in claim 1 wherein, said memory comprises random access memory.

6. The method in claim 1 wherein, said memory comprises non-volatile disk memory.

7. The method in claim 1 wherein, said objects comprise multi-dimensional data points and said references to said plurality of objects comprise database pointers, each pointing to one of said plurality of data points.

8. The method in claim 1 wherein, said objects comprise d-dimensional data points, and said step of partitioning said object set to associate ones of said plurality of objects among said plurality of processing elements comprises the steps of:

selecting a number of partitioning dimensions D for a number of points n, and a plurality of processors P;

estimating $p^{1/D}$ quantile values using the $i^{th}$ dimension of the points ($p_{di}$) for each subpartition;

dividing each said subpartition into $p^{1/D}$ subpartitions based on said estimated quantile values;

redistributing said data points among said $p^{1/D}$ new subpartitions;

comparing the current partitioning dimension D after each said estimation, dividing, and redistribution to determine if the current level of partitioning i has a predefined magnitude relationship relative to said number of partitioning dimensions, and if said predefined magnitude relationship is satisfied returning from said partitioning, and otherwise recursively applying said steps of estimating, dividing, and redistributing for each subpartition at the next partitioning level having the partitioned data set.

9. The method in claim 8, wherein said partitioning comprising applying single pass quantiling procedure having a sampling subprocedure and a quantile finding subprocedure.

10. The method in claim 1 where in said tree is an ϵ-k-d-B tree.

11. The method in claim 1 wherein, said objects comprise d-dimensional data points, and said step of partitioning said object set to associate ones of said plurality of objects among said plurality of processing elements determines quantiles estimated based on a sample data set and comprises the steps of:

identifying a number of processors p among which said data set (DS) is to be partitioned;

sampling said entire data set (DS) to generate a sample set of points (SS) which are fewer than said entire data set;

distributing said sample set of points over said identified number of processors;

identifying a partitioning rule for associating particular ones of said data points among said identified number of processing elements without redistributing said data points;

determining partition region boundaries for said identified partitions;

broadcasting said region boundaries for said partitioned sample set (SS) by each said processing element to every other of said processing elements; and redistributing, by each said processing element, said entire data set (DS) using said region boundaries determined from said sampled data set quantiles.

12. The method in claim 1 wherein, said objects comprise d-dimensional data points, and said step of partitioning said object set to associate ones of said plurality of objects among said plurality of processing elements determines quantiles based on a weighting for each data point, and comprises the steps of:

selecting a sample size s;

generating a sampled data set of size s from said entire data set;

partitioning said sampled data set using a quantile partitioning procedure;

within each said processing element, constructing a local ϵ-k-d-B tree for each data points associated with each said partitioned sampled data set on a point-by-point basis until all data points in said partition have been placed in said tree;

identifying and exchanging intersected regions among said processing elements;

computing the number of join tests that would be required to join the data sets but without actually joining said data;

computing a data point weight value (W) for each point based on said computed number of join tests;

performing weighted partitioning of said data set using said weight values to take into account the work load associated with particular ones of said points in addition to the number of points in each partition to determine weighted region boundaries for each of said processing elements; and redistributions said entire data set using region boundaries identified by said weighted partitioning.

13. The method in claim 12, wherein said step of performing weighted partitioning to determine weighted region boundaries for each of said processing elements comprises the steps of:

recursively performing for each subpartition at each partitioning dimension (D) the steps of:

sorting said data set along a partitioning dimension i;

computing a prefix-sum on said point weight values; and redistributing said data set in each subpartition using region boundaries determined for said subpartition.

14. The method in claim 12, wherein said weights are assigned to said data points on the basis of the estimated work associated with the number of join tests required for each said point and the work associated with traversing the tree for each data point.

15. The method in claim 12, wherein said point weight values (W) are assigned to each point (q) according to the equation $W(q)=(r\times d)+(k\times 3^{depth})$ where r is the estimated number of join tests required for point q, d is the dimensionality of the data points, k is a constant of proportionality, and depth is the depth of the ϵ-k-d-B tree.

16. The method in claim 15, wherein k is a positive constant in the range between 0.1 and 10.

17. The method in claim 15, wherein k is a positive constant in the range between 1 and 3.

18. The method in claim 1 wherein, said step of constructing an object tree structure organizing said ones of said plurality of objects associated with said particular processing element comprises constructing an ϵ-k-d-B tree.

19. The method in claim 1 wherein, said step of determining intersecting regions by each processing element with neighboring processing elements for each said particular processing element based on predetermined first rules comprises the steps of:

identifying neighboring processors;

building a first list database structure and a second list database structure for each level of said local $\epsilon$-k-d-B tree in each processing element, said first list identifying for each location in said tree whether the sub-tree at that level is empty or stores a data point;

exchanging said first and second lists between said processing elements including communicating said first and second list to every other of said processing elements over said interconnect network and receiving a communication of other of said first and second list from said other processing elements;

determining an intersected region by comparing entries in said first list of a particular processing element with said second list of every other one of said processing elements to generate a third resultant list data structure in memory; and assigning intersected regions to said processing elements based on predetermined rules.

20. The method in claim 19, wherein elements of said first and second lists comprise binary values and said step of determining an intersected region comprising performing an element-by-element logical operation between said first and second lists.

21. The method in claim 1, wherein said step of joining said objects based on a predetermined object similarity criteria to generate joined groups of multi-dimensional objects comprises performing a self-join procedure for each non-leaf node including a non-self-join procedure, and performing a leaf-self-join procedure for each leaf-node including a leaf-non-self-join procedure for each leaf-node.

22. A computer readable storage medium for use with a computer system, the system having a plurality of processors and a user interface for receiving commands from a user, said storage medium storing a plurality of objects and a plurality of executable procedures wherein each said procedure comprises at least one executable instruction which instructs said computer to search said plurality of objects according to query inputs from said user to identify ones of said plurality of objects having a similar characteristic, said plurality of instructions comprising:

instructions which instruct the computer to store ones of said plurality of objects in said memory;

instructions which instruct the computer to partition said objects into a plurality of subpartitions and to associate ones of said plurality of objects among said plurality of processors;

instructions which instruct the computer to construct a local $\epsilon$-k-d-B object tree structure organizing said ones of said plurality of objects associated with said particular processor;

instructions which instruct the computer to determine intersecting regions of said object space with neighboring processors;

instructions which instruct the computer to exchange objects with neighboring processors based on predetermined rules where said neighboring processors are processors associated with objects that are within some predetermined distance; and instructions which instruct the computer to join said objects based on a predeterained object similarity criteria to generate joined groups of multi-dimensional objects; and said objects comprising a data structure representing said objects in hierarchical manner, and including an array of database elements and indices and pointers associated therewith;

said procedures further including instructions for traversing said data structure using said array of indices and pointers to access the contents of said database elements; and procedures for establishing said data structure in said memory to represent said joined groups of multi-dimensional objects.

23. A computer system comprising:

a plurality of process in g elements each said processing element having a processor for executing instructions and an associated memory connected to said processing element, said memory storing o objects and a plurality of procedures;

storage means for storing a plurality of objects;

an interconnect network coupling said processing elements with said associated memory and to said storage means;

said plurality of procedures including a procedure for performing a multi-dimensional similarity join operation on said objects to generate pairs of joined multi-dimensional objects; and means for executing said procedure for performing a multi-dimensional similarity join operation to generate said pairs of joined multi-dimensional objects.

24. The computer system in claim 23, wherein said means for executing said procedure comprises:

means for storing in said memory, references to said plurality of objects in said object set;

means for partitioning said object set into a plurality of subpartitions to associate ones of said plurality of objects among said plurality of processing elements;

means, within each processing element, for constructing an $\epsilon$-k-d-B object tree structure organizing said ones of said plurality of objects associated with said particular processing element;

means, within each particular processing element, for determining intersecting regions with neighboring processing elements for each said particular processing element based on predetermined first rules;

means for exchanging objects between each said particular processing element and said neighboring processing elements based on predetermined second rules; and means for joining said objects based on a predetermined object similarity criteria to generate joined groups of multi-dimensional objects.

25. In a computer system having a multiplicity of processing elements each having a central processing unit and memory and wherein said processing elements are connected by an interconnection network, a method for rapidly and efficiently performing a parallel query of a database of high-dimensional data items to identify similar items having user defined similarity characteristics and joining said similar items into an output set of data items; said method characterized in that:

said database comprises an $\epsilon$-k-d-B tree structure and is partitioned among said multiplicity of processing elements based on a load balancing weighting operation rather than on the number of points along;

said weighting are computed based on a traversal cost and a computation cost for said $\epsilon$-k-d-B tree in combination; and said joining of said similar items into an output set of data items generating a joined set of multi-dimensional data items.

26. A weighted quantiling method of partitioning a database comprised of a d-dimensional data set of items among a plurality of processing elements and memory associated with each said processing elements, said method comprising the steps of:

generating a sampled data set of size s from said entire data set;

partitioning said sampled data set using a quantile partitioning procedure;

within each said processing element, constructing a local $\epsilon$-k-d-B tree for each data points associated with each said partitioned sampled data set on a point-by-point basis until all data points in said partition have been placed in said tree;

identifying and exchanging intersected regions among said processing elements;

computing the number of join tests that would be required to join the data sets but without actually joining said data;

computing a data point weight value for each point based on said computed number of join tests;

performing weighted partitioning of said data set using said weight values to take into account the work load associated with particular ones of said points in addition to the number of points in each partition to determine weighted region boundaries for each of said processing elements; and redistributing said entire data set using region boundaries identified by said weighted partitioning.

27. The method in claim 26, wherein said step of perform weighted partitioning to determine weighted region boundaries for each of said processing elements comprises the steps of:

recursively performing for each subpartition at each partitioning dimension (D) the steps of:

sorting said data set along a partitioning dimension i;

computing a prefix-sum on said point weights (W); and redistributing said data set in each subpartition using region boundaries determined for said subpartition.

28. The method in claim 27, wherein said weights are assigned to said data points on the basis of the estimated work associated with the number of join tests required for each said point and the work associated with traversing the tree for each data point.

29. The method in claim 27, wherein said point weight values (W) are assigned to each point (q) according to the equation $W(q)=(r \times d)+(k \times 3^{depth})$ where r is the estimated number of join tests required for point q, d is the dimensionality of the data points, k is a constant of proportionality, and depth is the depth of the $\epsilon$-k-d-B tree.

30. The method in claim 29, wherein k is a positive constant in the range between substantially 1 and 3.

* * * * *